United States Patent
Matt

(10) Patent No.: US 9,835,934 B2
(45) Date of Patent: Dec. 5, 2017

(54) SYSTEMS AND METHODS FOR MOUNTING PHOTOGRAPHIC EQUIPMENT

(71) Applicant: Chips Unlimited, Inc., Tempe, AZ (US)

(72) Inventor: Michael Matt, Phoeniz, AZ (US)

(73) Assignee: Chips Unlimited, Inc., Tempe, AZ (US)

(*) Notice: Subject to any disclaimer, the term of this patent is extended or adjusted under 35 U.S.C. 154(b) by 0 days.

(21) Appl. No.: 14/966,915

(22) Filed: Dec. 11, 2015

(65) Prior Publication Data
US 2016/0170289 A1  Jun. 16, 2016

Related U.S. Application Data

(60) Provisional application No. 62/091,209, filed on Dec. 12, 2014.

(51) Int. Cl.
*F16M 13/00* (2006.01)
*G03B 17/56* (2006.01)
*F16M 13/02* (2006.01)

(52) U.S. Cl.
CPC .......... *G03B 17/561* (2013.01); *F16M 13/02* (2013.01); *F16M 2200/04* (2013.01)

(58) Field of Classification Search
USPC ....... 318/625, 626, 264–266, 272, 275, 277, 318/282, 286, 466–469, 558; 248/187.1; 396/419
See application file for complete search history.

(56) References Cited

U.S. PATENT DOCUMENTS

| | | | | |
|---|---|---|---|---|
| 2,472,944 A * | 6/1949 | Furer | ................... | B66F 11/048 182/2.7 |
| 3,970,835 A * | 7/1976 | Crete | ..................... | G03B 15/02 362/11 |
| 4,382,624 A * | 5/1983 | Lysenko | ................. | B66C 3/005 294/119.4 |
| 5,449,138 A * | 9/1995 | Ciancio | .................. | F16M 11/10 248/123.2 |
| 5,671,932 A * | 9/1997 | Chapman | .............. | B66F 11/048 180/19.1 |
| 5,769,594 A * | 6/1998 | Kalua | ................... | B65F 3/0203 414/408 |
| 9,003,628 B2 * | 4/2015 | Perkins | ................. | B23P 19/047 29/451 |

* cited by examiner

*Primary Examiner* — Bentsu Ro
(74) *Attorney, Agent, or Firm* — Snell & Wilmer L.L.P.

(57) ABSTRACT

An apparatus is provided comprising a shaft having an axis and mounted to a boom structure, a support structure configured to be coupled to the shaft, wherein the support structure is configured to rotate about the axis. In addition, a method is provided comprising translating a cradle along a vertical axis, and rotating, in response to the translating, a support structure about a shaft, wherein the cradle is supported by the support structure, wherein the cradle remains stationary with regard to pitch rotation during the translating.

16 Claims, 26 Drawing Sheets

SYSTEMS AND METHODS FOR MOUNTING PHOTOGRAPHIC EQUIPMENT

CROSS REFERENCE TO RELATED APPLICATIONS

This application is a nonprovisional application of, and claims priority to and the benefit of, U.S. Provisional Patent Application Ser. No. 62/091,209, filed Dec. 12, 2014, and entitled "SYSTEMS AND METHODS FOR MOUNTING PHOTOGRAPHIC EQUIPMENT," which is hereby incorporated by reference in its entirety.

FIELD

The present disclosure relates to systems and methods for mounting photographic equipment, for example, a camera.

BACKGROUND

Handheld video capture is typically impaired by vibration and/or other movements of the camera operator. As vibrations are transmitted to the camera, video captured by the camera may become blurry or "jittery." This effect tends to be unsettling to the viewer. Capturing video with a camera in a fixed position, such as on a stationary tripod, may not be appropriate for all types of photography. Moreover, many conventional systems provide limited degrees of freedom for camera movement.

SUMMARY

Systems and methods for mounting photographic equipment are disclosed herein. In various embodiments, an apparatus is provided comprising a shaft having an axis and mounted to a boom structure, a support structure configured to be coupled to the shaft, wherein the support structure is configured to rotate about the axis.

In various embodiments, a method is provided comprising translating a cradle along a vertical axis, and rotating, in response to the translating, a support structure about a shaft, wherein the cradle is supported by the support structure, wherein the cradle remains stationary with regard to pitch rotation during the translating.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
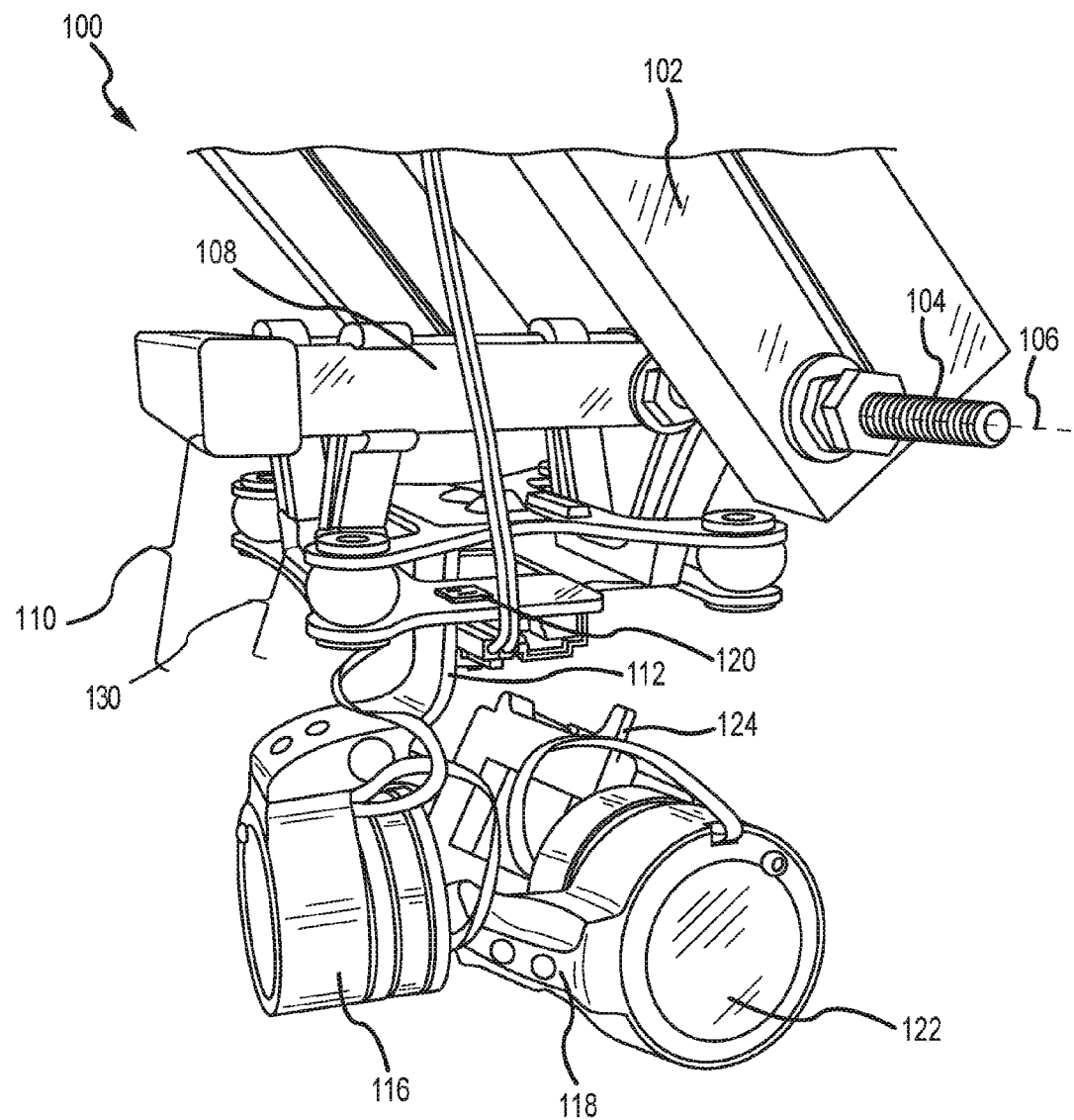
FIG. 1 illustrates a camera mount system, in accordance with various embodiments.
Figure 2A:
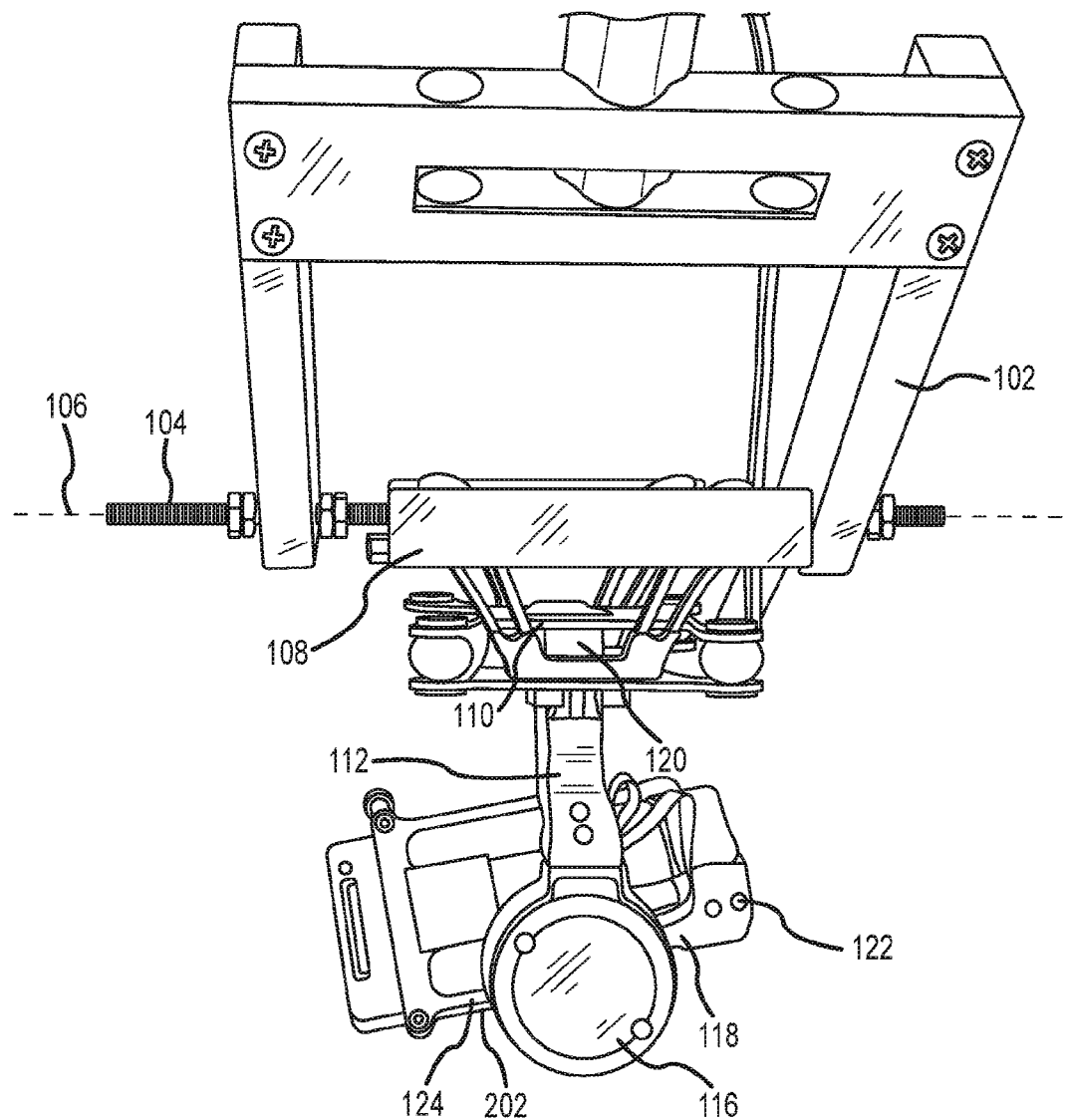
FIGS. 2*a* and 2*b* illustrate a camera mount system, in accordance with various embodiments.
Figure 2B:
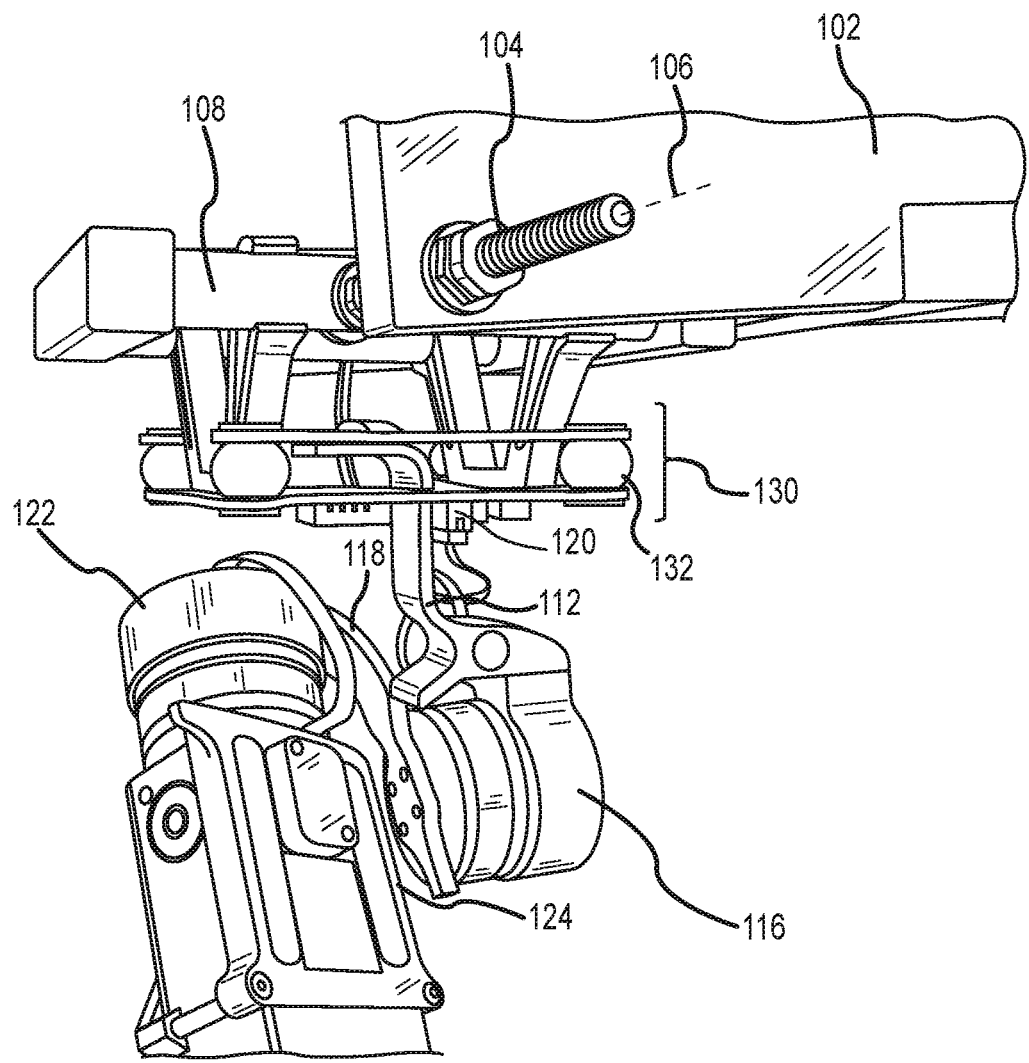
Figure 3:
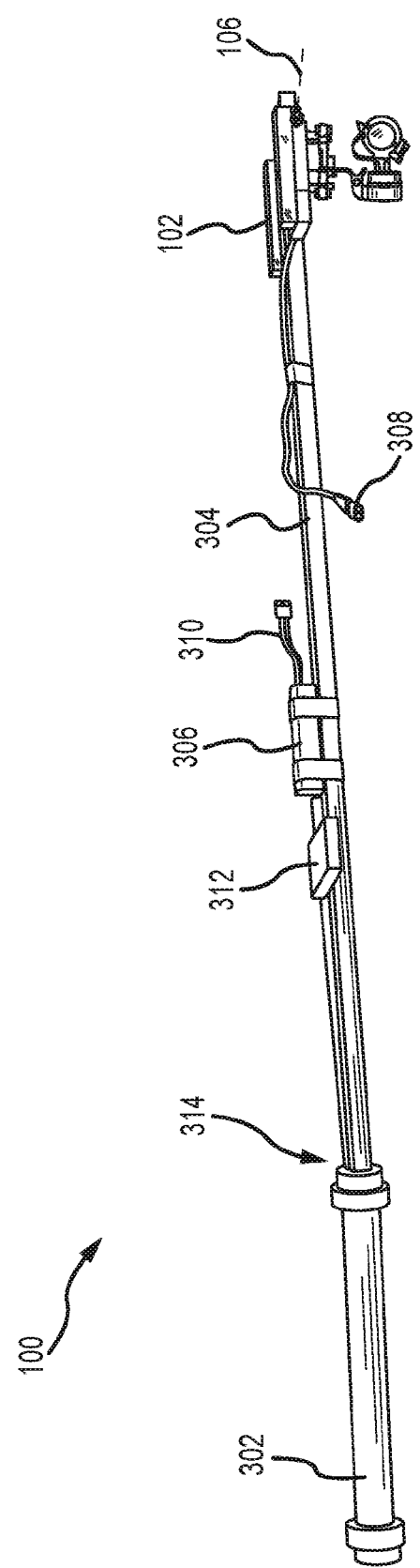
FIG. 3 illustrates a camera mount system including a boom, in accordance with various embodiments.
Figure 4:
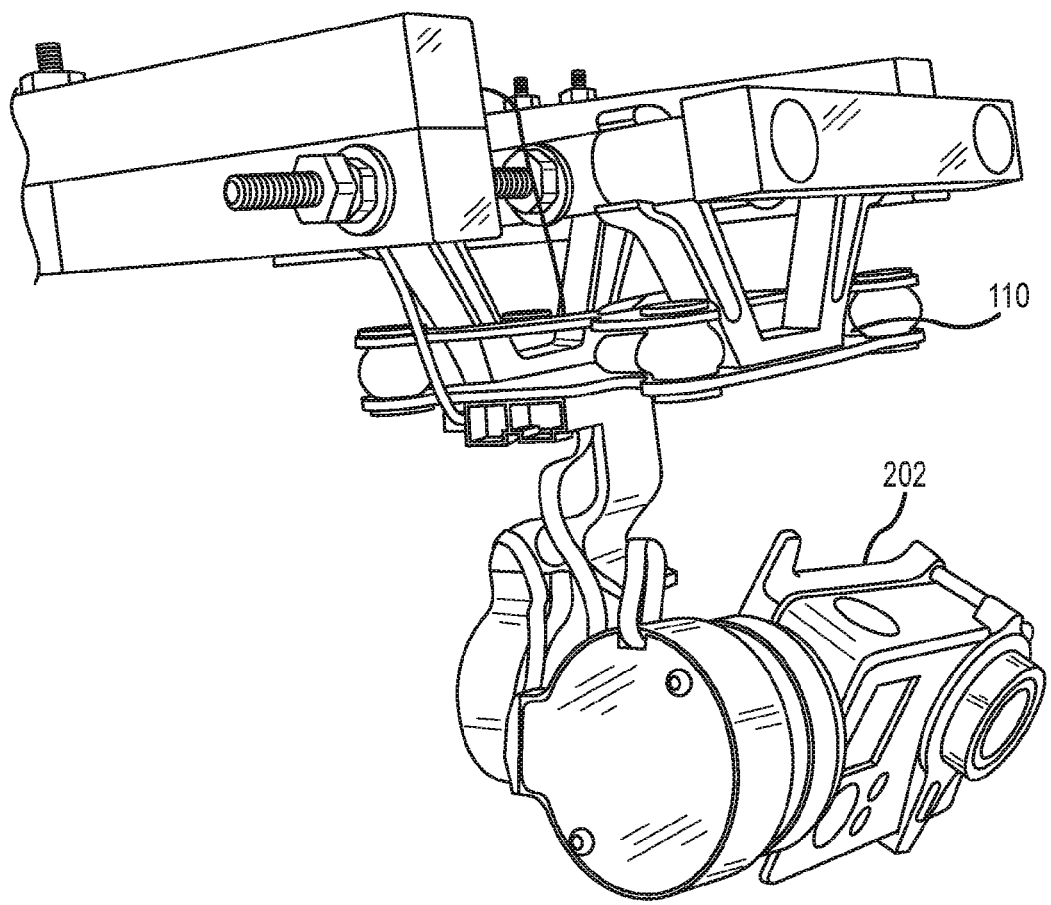
FIG. 4 illustrates a camera mount system, in accordance with various embodiments, including a boom and a counterweight.
Figure 5:
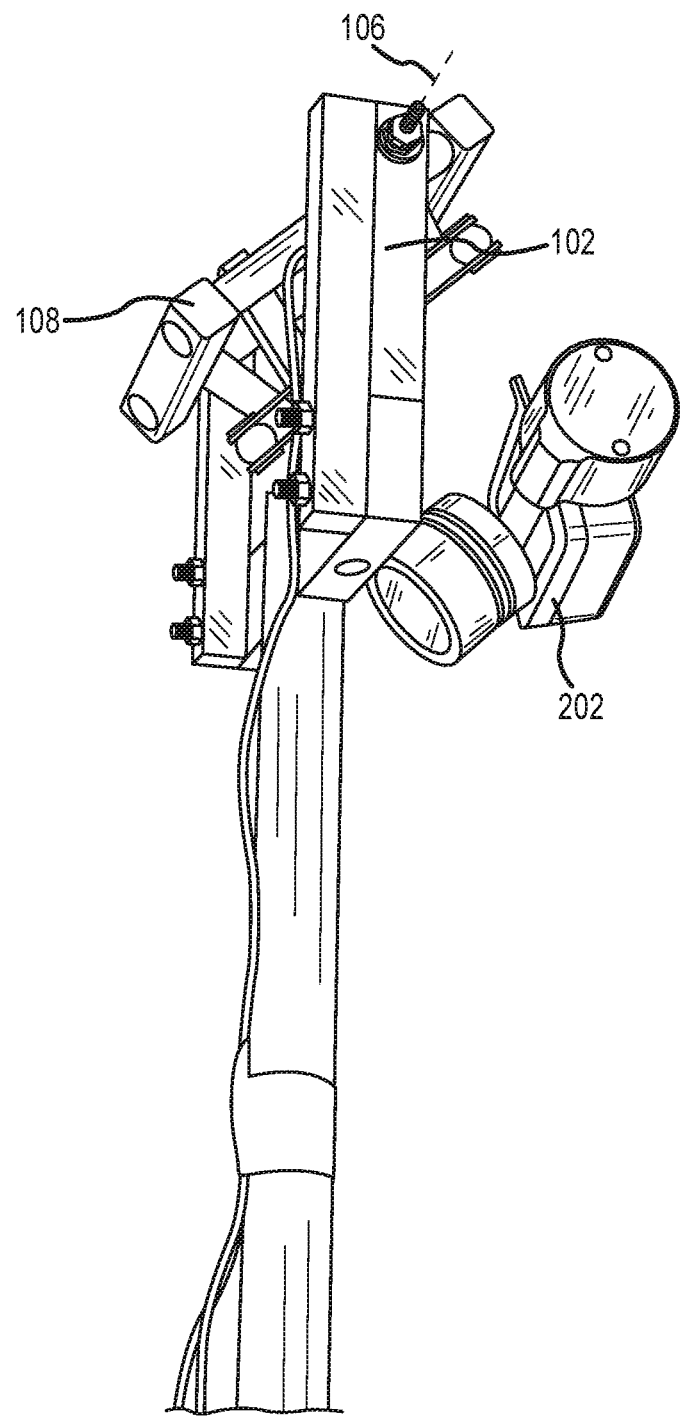
FIG. 5 illustrates a camera mount system, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the term "photographic equipment" may include any camera or device that functions as a camera. A camera may include any device that may capture photographic images, whether stationary or moving, such as still photographs and/or moving pictures (i.e., video) on any media form (e.g., film, digital storage media, etc.). A camera may include devices such as a video camera, single lens reflex camera, a mirrorless camera, and the like and may also include devices that include cameras, such as smartphones (e.g., IPHONE, etc.), tablet computers, laptop computers, and feature phones that include cameras. As described herein, a camera mount system may be configured to receive and/or retain a camera.

In various embodiments, a camera mount system is disclosed that tends to reduce, for example, transmission of vibrations and other undesired movements to a camera. In addition, in various embodiments, a camera mount system is disclosed that, in response to a change in pitch, allows for rotational movement about a shaft. In that regard, the pitch of a camera may remain constant or substantially constant unless a change in pitch is commanded.

In that regard, in various embodiments, a boom structure may support a shaft that defines an axis of rotation. A support structure may be coupled to the shaft and configured to rotate about the axis of rotation. The support structure may be allowed to freely rotate about the shaft, such that the support structure's rotation is caused by the force of gravity. For example, a change in the pitch of the boom structure may cause the support structure's rotation about the shaft. In that regard, the pitch of the camera would not change substantially, if at all. Such configuration, however, allows a camera to translate along a z axis, as described herein, with minimal or no disruption in pitch.

In various embodiments, the camera mount system is modular in nature. In that regard, various components of the camera mount system may be configured to be interchangeable, allowing one to quickly alter the camera mount system to be suitable for various shooting purposes. In various embodiments, the modular nature of the camera mount system allows for connection of electrical lines (e.g., wires) to convey power and/or data to each modular component of the camera mount system, enabling a centralized power source and selectable location for various control devices. For example, booms of various lengths, vehicular mounts, control modules, etc., may be interconnected within the camera mount system.

In various embodiments, a control system is coupled to the support structure. A control system may be a system that may measure acceleration or other types of motion and command one or more servomotors to counteract and/or cancel the effects of such acceleration or other types of motion on, for example, a camera or a cradle configured to receive a camera. A control system may comprise an accelerometer or other instrument configured to detect and/or measure other types of motion. A control system may comprise a processor and a tangible, non-transitory memory configured to receive input from, for example, the accelerometer and calculate or otherwise determine commands to counteract and/or cancel the effects of such acceleration. The processor may then transmit such commands to one or more servomotors.

Figure 10:
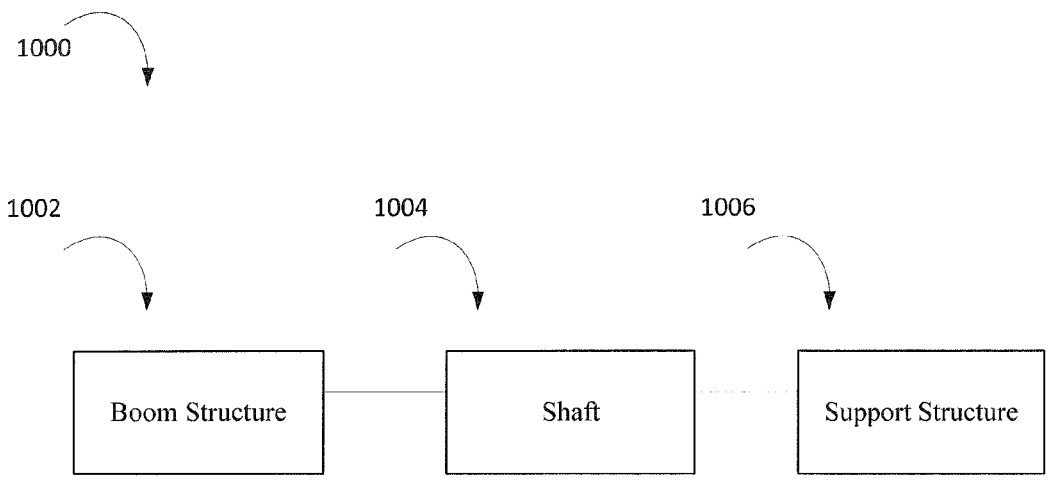
FIG. 10 illustrates a functional diagram of a camera mount system, in accordance with various embodiments.

With momentary reference to FIG. 10, functional diagram 1000 is shown. Boom structure 1002 is shown mounted to shaft 1004. Shaft 1004 is shown mounted to support structure 1006. Support structure 1006 is configured to rotate about shaft 1004.

Figure 8:
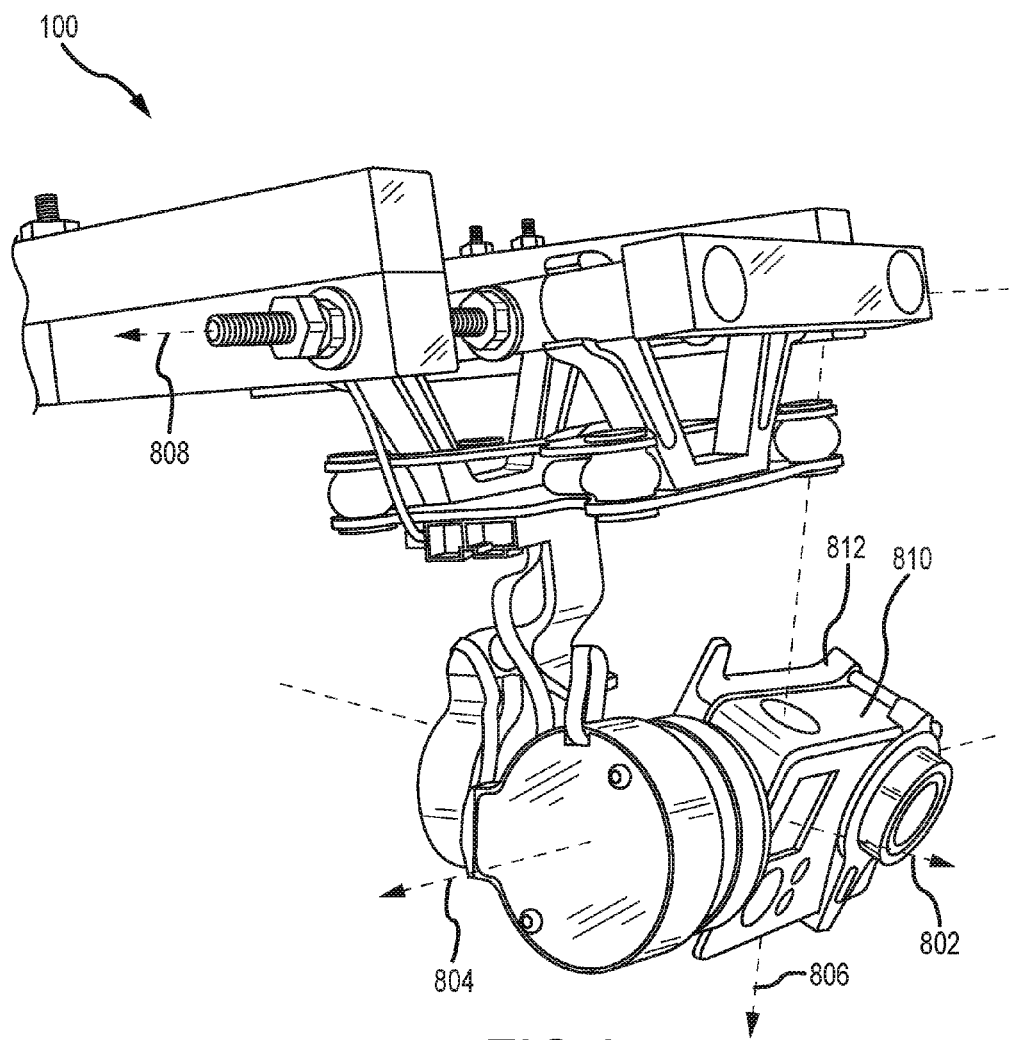
FIG. 8 illustrates a camera mount system, in accordance with various embodiments, and showing certain axes of rotation.

With momentary reference to FIG. 8, camera mount system 100 is shown. Camera 810 is shown having 3 axes of rotation. Camera 810 is mounted to cradle 812, and as shown it may be understood that rotation of the cradle would cause a corresponding rotation in the camera. Camera 810 coupled to cradle 812 may be referred to as a camera and cradle assembly. As used herein, pitch may refer to rotation of a camera, cradle, or camera and cradle assembly relative to a horizontal axis. This is sometimes referred to as "tilt." For example, the orientation of a camera, cradle, or camera and cradle assembly about axis 804 may be referred to as pitch and rotation about axis 804 may be referred to as pitch rotation. As used herein, yaw may refer to rotation of a camera, cradle, or camera and cradle assembly about a vertical axis. This is sometimes referred to as "pan." For example, the orientation of a camera, cradle, or camera and cradle assembly about axis 806 may be referred to as yaw and rotation about axis 806 may be referred to as yaw rotation. As used herein, roll may refer to rotation of a camera, cradle, or camera and cradle assembly about an axis extending through the lens of the camera or parallel to the lens of the camera. For example, the orientation of a camera, cradle, or camera and cradle assembly about axis 802 may be referred to as roll and rotation about axis 802 may be referred to as yaw rotation. Axis of rotation 808 may allow camera 810 to translate along axis 806 without affecting or substantially affecting the pitch of the camera.

With reference to FIGS. 1-4, camera mount system 100 is shown. Boom structure 102 may be coupled to or integrally a part of boom 304. Boom structure 102 is shown supporting shaft 104. Shaft 104 defines axis of rotation 106. Support structure 108 is coupled to shaft 104 and is free to rotate about axis of rotation 106. Control system 110 is mounted to support structure 108. Control system 110 is coupled to upper arm 112. Upper arm 112 is coupled to first servomotor 116. First servomotor 116 is coupled to lateral arm 118. Lateral arm 118 is coupled to second servomotor 122. Second servomotor is coupled to cradle 124.

Boom 304 may be comprised of any suitable material. For example, boom 304 may be comprised of a metal (e.g., stainless steel or aluminum), wood, thermoplastic, composite materials (e.g., carbon fiber composites), and combinations thereof. Boom 304 may house, either internally or externally, wires or other conductive structures that may place processor 120 in electrical communication with an input device and/or power supply 306. Cable 308, for example, may couple to cable 310 that places power supply 306 in electrical communication with control system 110. Power supply 306 may be any suitable power supply, for example, a DC source such as a battery. Mount 312 may be configured to receive a control device. The control device may be a smartphone or other computing device configures to convey command signals to control system 110, either through a wire or through radio frequency ("RF") communications.

Boom 304 may couple to counterweight 302. Counterweight 302 may be configured to attach to boom 304, for example, through threaded engagement. Counterweight 302 may be selected to counterbalance the weight of boom structure 102 plus the structures attached to boom structure 102. In that regard, counterweight 302 may be selected such that the center of gravity of boom 304 and counterweight 302 may be located at or near the coupling point of boom 304 and counterweight 302. As shown, the coupling point of boom 304 and counterweight 302, point 314, is also the center of gravity for camera mount system 100. Accordingly, operation of boom 304 may be performed manually with little manual exertion.

Boom structure 102 may comprise any structure suitable for supporting a shaft, for example, shaft 104. In various embodiments, boom structure 102 is a clevis and shaft 104 is a clevis pin. As shown, boom structure 102 is a U shaped clevis that supports shaft 104. Though the size of the clevis may be adjusted, in various embodiments, a clevis shaped boom structure 102 may provide sufficient clearance so that support structure 108 is able to rotate 360 degrees about shaft 104. However, in various embodiments, a clevis shaped boom structure 102 may be sized to prevent 360 degree rotation of support structure 108. Boom structure 102 may be comprised of any suitable material. For example, boom structure 102 may be comprised of a metal (e.g., stainless steel or aluminum), wood, thermoplastic, composite materials (e.g., carbon fiber composites), and combinations thereof.

With continued reference to FIGS. 1-4, shaft 104 may comprise any suitable material. For example, shaft 104 may be comprised of a metal (e.g., stainless steel or aluminum), wood, thermoplastic, composite materials (e.g., carbon fiber composites), and combinations thereof. Shaft 104 may have a surface that is substantially smooth or, in various embodiments, shaft 104 may be threaded or otherwise textured. A surface of shaft 104 may be configured to allow support structure 108 to rotate about the shaft. In that regard, shaft 104 may be coupled to bearings, a race, or other member that allows support structure 108 to rotate. In various embodiments, support structure 108 may have a degree of freedom along axis of rotation 106. Stated another way, support structure 108 may be allowed to translate parallel to axis of rotation 106. However, in various embodiments, support structure 108 is fixed with regard to motion parallel to axis of rotation 106

Figure 6:
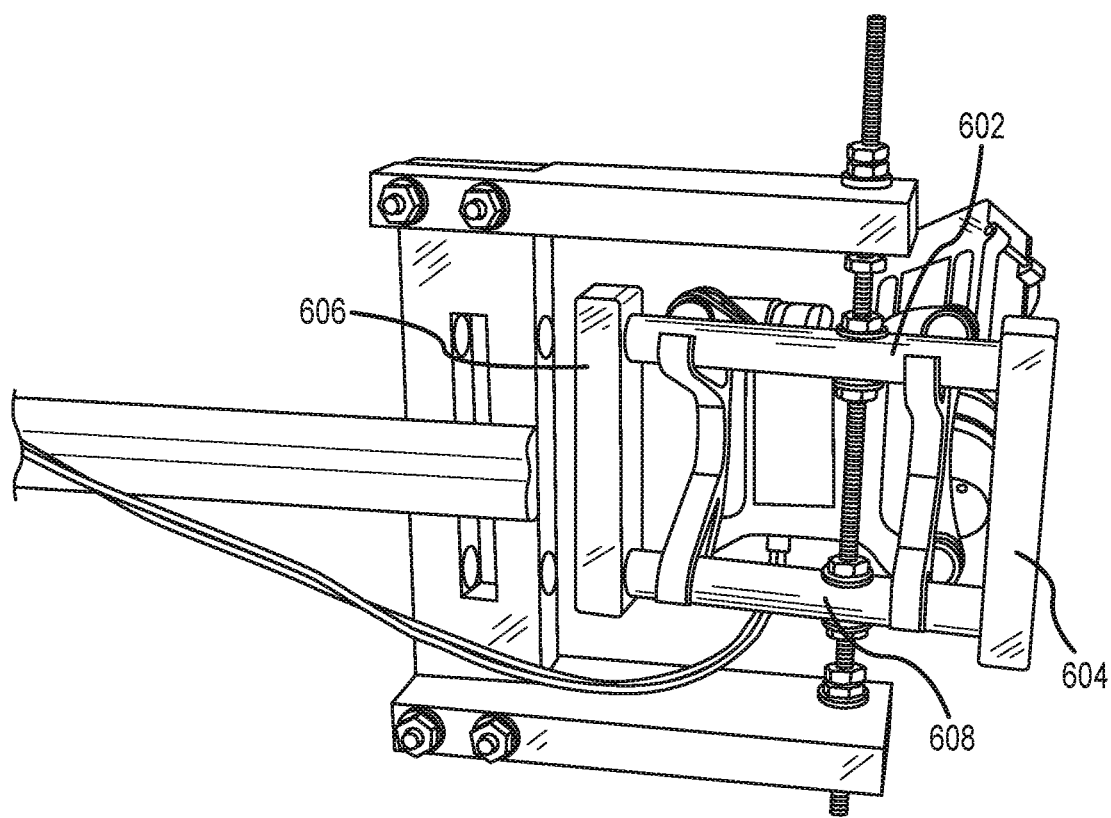
FIG. 6 illustrates a camera mount system, in accordance with various embodiments.

Support structure 108 may comprise any structure capable of coupling to shaft 104. Support structure 108 may be configured to support the weight of a camera and control system. Support structure 108 may take a variety of configurations. For example, with momentary reference to FIG. 6, support structure 108 comprises a frame comprising cross members 604 and 606 coupled to support members 602 and 608. In that regard, support structure 108 may take the shape of a quadrilateral such as a rectangle. However, in various embodiments, support structure 108 may comprise any geometric shape, and in various embodiments, support structure 108 may comprise a solid surface such as a plate.

Figure 7:
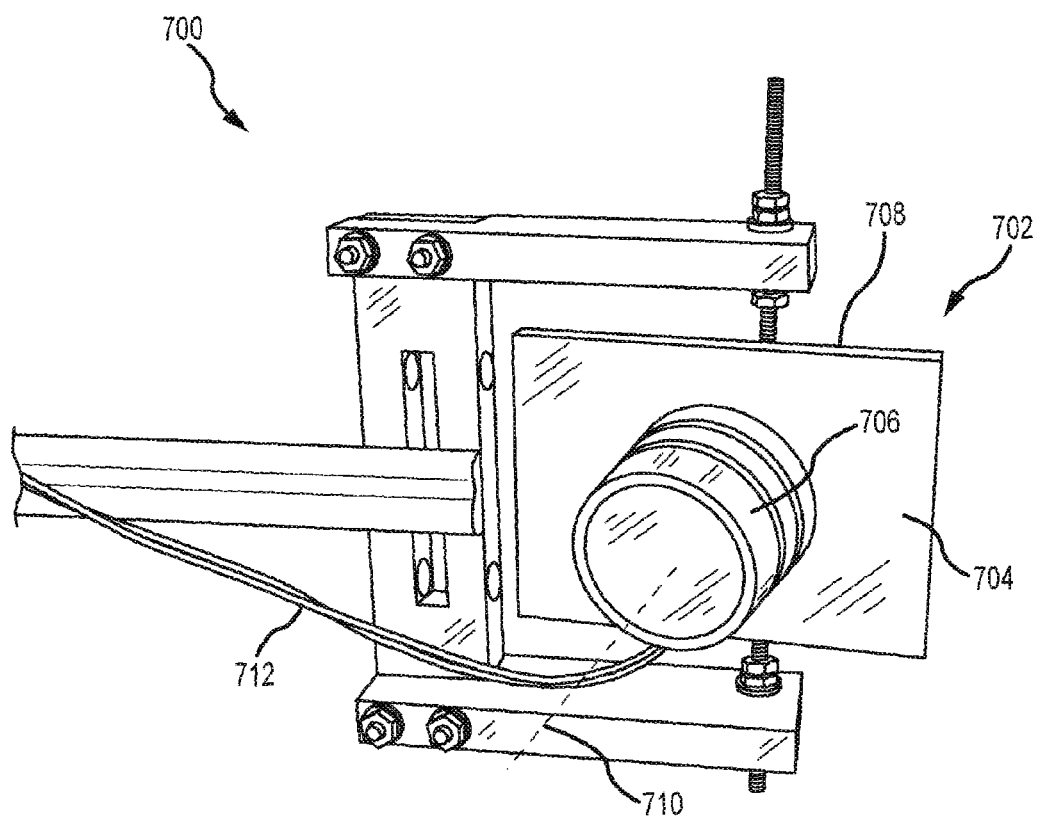
FIG. 7 illustrates a camera mount system, in accordance with various embodiments, and having a pan servomotor.

In various embodiments, with reference to FIG. 7, camera mount system 700 is illustrated having support structure 702 comprises plate 704. Plate 704 is coupled to pan servomotor 706. Pan servomotor 706 is coupled to control system 708 and configured to rotate control system 708 in a yaw direction. Pan servomotor 706 may be coupled to control system 708 through the plane of plate 704. Yaw direction is shown in FIG. 7 as illustrated by axis of rotation 710. Stated another way, pan servomotor may control the yaw of control system 708. Pan servomotor may operate in response to pan commands received by, for example, an input device. Wire 712 or other conductive structures may relay driving power and/or commands to pan servomotor 706. In various embodiments, however, commands and/or driving power may be relayed to pan servomotor 706 wirelessly, for example, through RF communication. Camera mount system 700 may otherwise be similar or identical to camera mount system 100.

Support structure 108 may be comprised of any suitable material. For example, support structure 108 may be comprised of a metal (e.g., stainless steel or aluminum), wood, thermoplastic, composite materials (e.g., carbon fiber composites), and combinations thereof Support structure 108 may be configured to attach to a control system. Support structure 108 may be coupled to the control system by any suitable method, for example by fasteners, brackets, clips and/or adhesives. Support structure 108 thus acts to couple a control system to shaft 104.

In various embodiments, a control system may comprise a camera mount configured to provide image stabilization by, for example, actively cancelling and/or reducing the effects of vibration. A control system may thus be configured to identify vibrations, calculate actions to cancel and/or reduce the effect of vibration, and command other components such as one or more servomotors.

With continued reference to FIGS. 1-4, control system 110 is illustrated. Control system 110 comprises, among other things, two parallel plates 130. One plate of such plates houses processor 120. The two parallel plates are coupled together via grommets such as grommet 132.

Control system 110 further comprises upper arm 112. Upper arm 112 is coupled to parallel plates 130 via any suitable means, though in various embodiments upper arm 112 may be coupled to any portion of control system 110. Upper arm 112 may be comprised of any suitable material. For example, upper arm 112 may be comprised of a metal (e.g., stainless steel or aluminum), wood, thermoplastic, composite materials (e.g., carbon fiber composites), and combinations thereof. Upper arm 112 extends away from the plate. Upper arm 112 is configured to be coupled to first servomotor 116. First servomotor 116 may couple to upper arm 112 by any suitable means, for example, via fasteners such as rivets and/or screws, or via brackets or clips. A wire or other conductive structure may place processor 120 in electrical communication with first servomotor 116.

With momentary reference to FIG. 8, first servomotor 116 may be configured to cause rotation about axis 802. Stated another way, first servomotor 116 is configured to cause rotation in a roll direction. First servomotor 116 may cause motion in a roll direction in response to commands from processor 120. First servomotor 116 is coupled to lateral arm 118.

With reference back to FIGS. 1-4, lateral arm 118 is coupled to first servomotor 116 via any suitable means. Lateral arm 118 may be comprised of any suitable material. For example, lateral arm 118 may be comprised of a metal (e.g., stainless steel or aluminum), wood, thermoplastic, composite materials (e.g., carbon fiber composites), and combinations thereof. Lateral arm 118 extends away from the plate. Lateral arm 118 is configured to be coupled to second servomotor 122. Second servomotor 122 may couple to lateral arm 118 by any suitable means, for example, via fasteners such as rivets and/or screws, or via brackets or clips. A wire or other conductive structure may place processor 120 in electrical communication with second servomotor 122 and/or first servomotor 116.

With momentary reference to FIG. 8, second servomotor 122 may be configured to cause rotation about axis 804. Stated another way, second servomotor 122 is configured to cause rotation in a pitch direction. Second servomotor 122 may cause motion in a pitch direction in response to commands from processor 120. Second servomotor 122 is coupled to cradle 124.

With reference back to FIGS. 1-4, cradle 124 may comprise any suitable cradle, bracket, or other structure capable of coupling to a camera. For example, cradle 124 may comprise a mounting plate having a screw. The screw may be accepted by a camera, in a similar manner by which a tripod screw engages a camera for mounting onto a tripod. In various embodiments, cradle 124 may comprise a clip or bracket that may mechanically retain a camera in contact or substantial contact with cradle 124.

Cradle 124 further comprises accelerometer 202. Accelerometer 202 may comprise any suitable accelerometer capable of sensing acceleration and/or other positional state information of cradle 124. For example, accelerometer 202 may comprise an accelerometer that is of a piezoelectric type, a Hall Effect type, a piezoresistive type, magnetorestrictive type, and/or a heat transfer type. Accelerometer 202 may measure the acceleration of cradle 124 relative to freefall. Stated another way, accelerometer 202 may determine the proper acceleration of cradle 124. For example, if cradle 124 is resting on the surface of the Earth, accelerometer 202 may record an acceleration of the gravitational constant ("g"). If cradle 124 were to experience freefall, accelerometer 202 may report that that the acceleration of cradle 124 is 0. Accelerometer 202 may be in electrical communication with processor 120 via, for example, wires or other conductive structures or wireless through, for example, RF signals. Accelerometer 202 may produce an output indicative of proper acceleration. In that regard, it is understood that accelerometer 202 may be analog or digital and, in accordance with various factors, may further include various signal processing elements and/or analog to digital convertors. Thus, the output of accelerometer 202 may be adjusted in accordance with the input configuration of processor 120. For example, various signal filters or other modifiers may be used to process the signal from accelerometer 202 prior to receipt by processor 120.

Accelerometer 202 may comprise multiple accelerometers. For example, and with reference to FIG. 8, accelerometer 202 may be configured to detect motion about axis 804 and/or axis 802.

Processor 120 may be configured to receive information from accelerometer 202 regarding motion about axis 804 and/or axis 802. Processor 120 may be configured to calculate counter-movements based upon the information from accelerometer 202 that will cancel and/or reduce the effect of the acceleration observed by accelerometer 202. For example, if accelerometer 202 indicates that motion about axis 804 may occur, processor 120 may command second servomotor 122 to move in an equal and opposite direction. In that manner, cradle 124 will stay motionless or nearly motionless with respect to axis 804. Processor 120 may be configured to command both first servomotor 116 and second servomotor 122.

For example, in various embodiments, processor 120 may be and/or may implement proportional-integral-derivative ("PID") control logic. PID control logic may involve generating control signals in response to the present error of a system, an accumulation of past errors in a system, and a prediction of future errors based upon the rate of change of errors in a system. PID logic may be used to control one or more servomotors to "cancel" unintended motion about one or more axes.

Accordingly, processor 120, first servomotor 116 and second servomotor 122 operate to maintain cradle 124 fixed with regard to axes 804 and 802. Thus, vibration from boom structure 102 is minimized. Moreover, cradle 124 may be translated along axis 806 without a change in pitch, as the force of gravity cause rotation about axis 808. Without such freedom, the pitch of cradle 124, and thus the pitch of a camera coupled to cradle 124 would also change in response to the translation along axis 808. Stated another way, the freedom of rotation about axis 808 allows cradle 124 the freedom to translate but not change pitch, enabling more aesthetically pleasing video capture and video capture that may maintain a more desirable frame composition.

Figure 9:
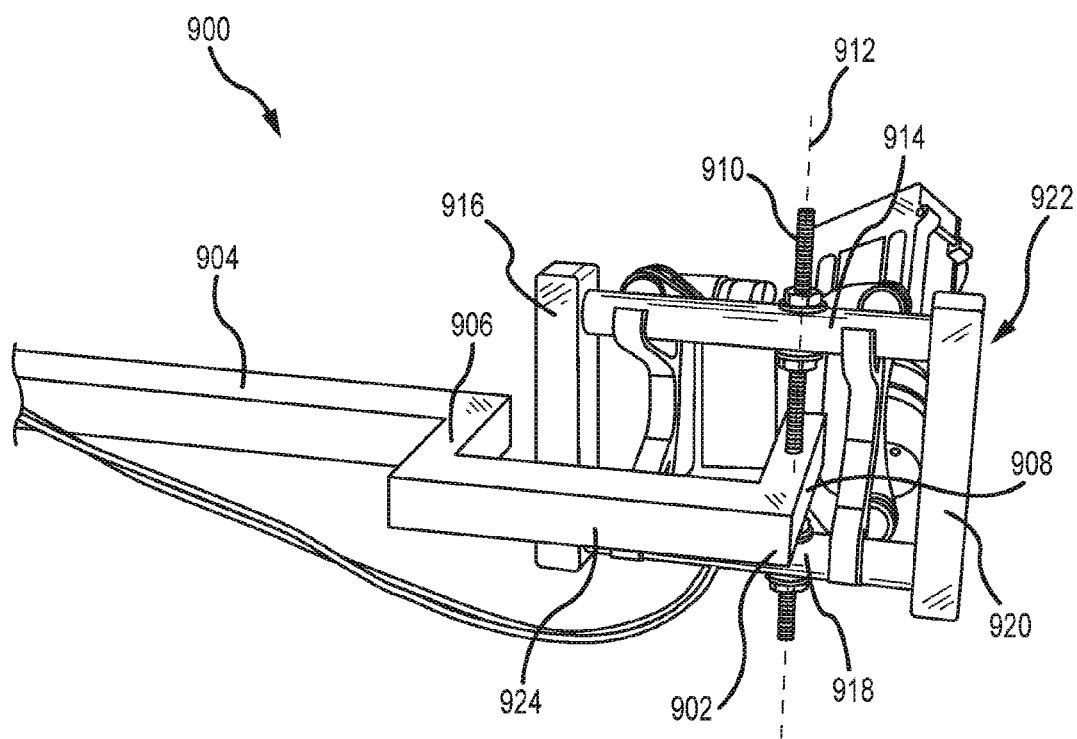
FIG. 9 illustrates a camera mount system, in accordance with various embodiments, having a bracket.

With reference to FIG. 9, camera mount system 900 is shown having a boom structure comprising bracket 902. Bracket 902 may comprise radial extending portion 906, axial extending portion 924 and radial inward portion 908. Bracket 902 supports shaft 910 that defines axis of rotation 912. Bracket 902 may be coupled to boom 904 and, in various embodiments, boom 904 may be integral to bracket 902, though in various embodiments, boom 904 and bracket 902 may be manufactured in discrete pieces and coupled together. Support structure 922 is coupled to shaft 910 and configured to rotate about axis of rotation 912. In that regard, support structure 922 is configured to rotate by the force of gravity as the pitch of bracket 902 is changed. Support structure 922 comprises cross members 920, 916 and support members 914, 918.

As described herein, a method is provided comprising translating a cradle along a vertical axis, and rotating, in response to the translating, a support structure about a shaft, wherein the cradle is supported by the support structure, wherein the cradle remains stationary with regard to pitch rotation during the translating. In that regard, with reference to FIGS. 1-4 and 8, cradle 124 may be translated along axis 806. In response to the translation, cradle 124 may rotate about shaft 104. The pitch of cradle 124 may thus remain constant or near constant during the translation along axis 806.

Figure 11:
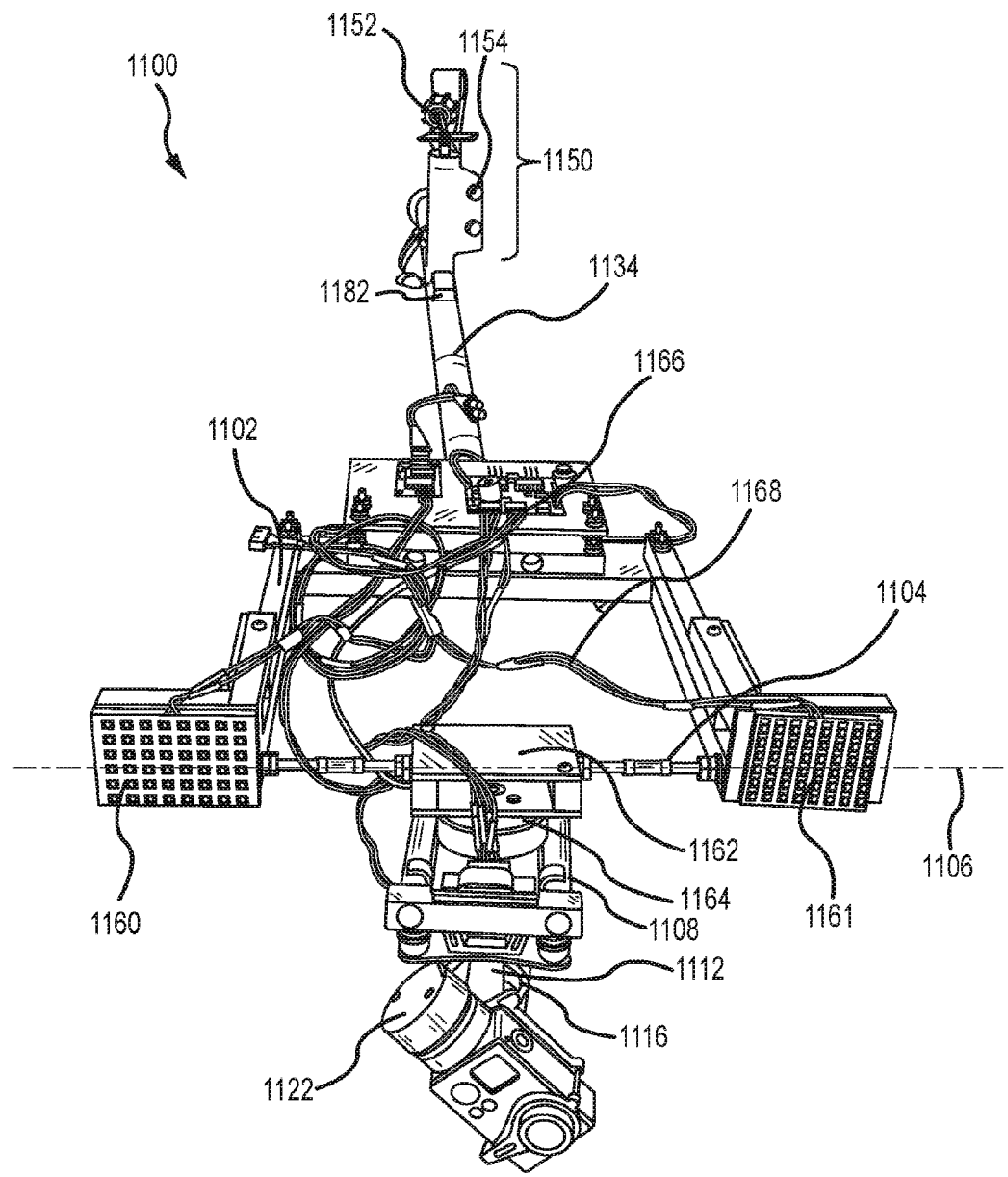
FIGS. 11-13 illustrate a camera mount system, in accordance with various embodiments, having a pan servomotor.
Figure 12:
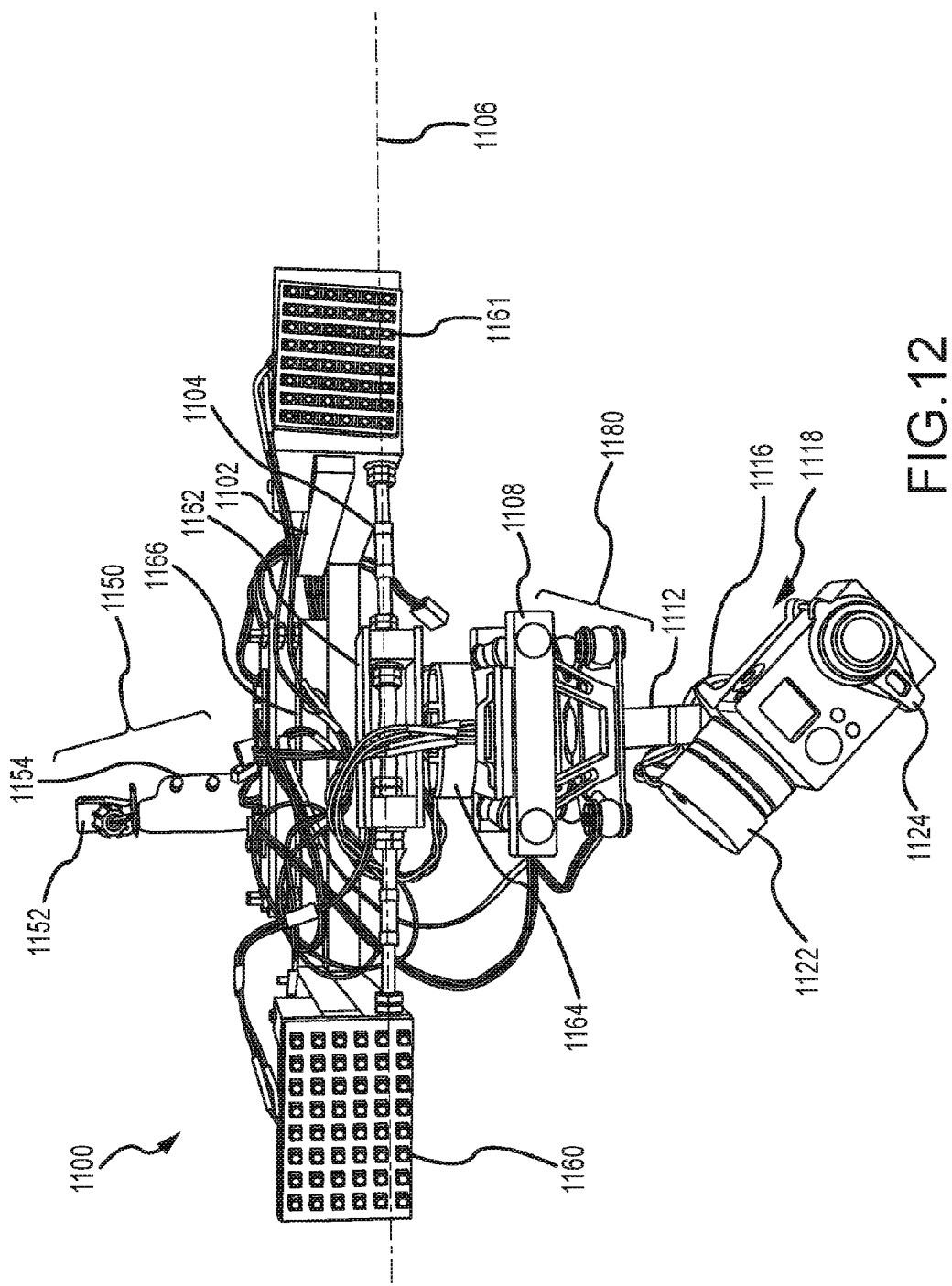
Figure 13:
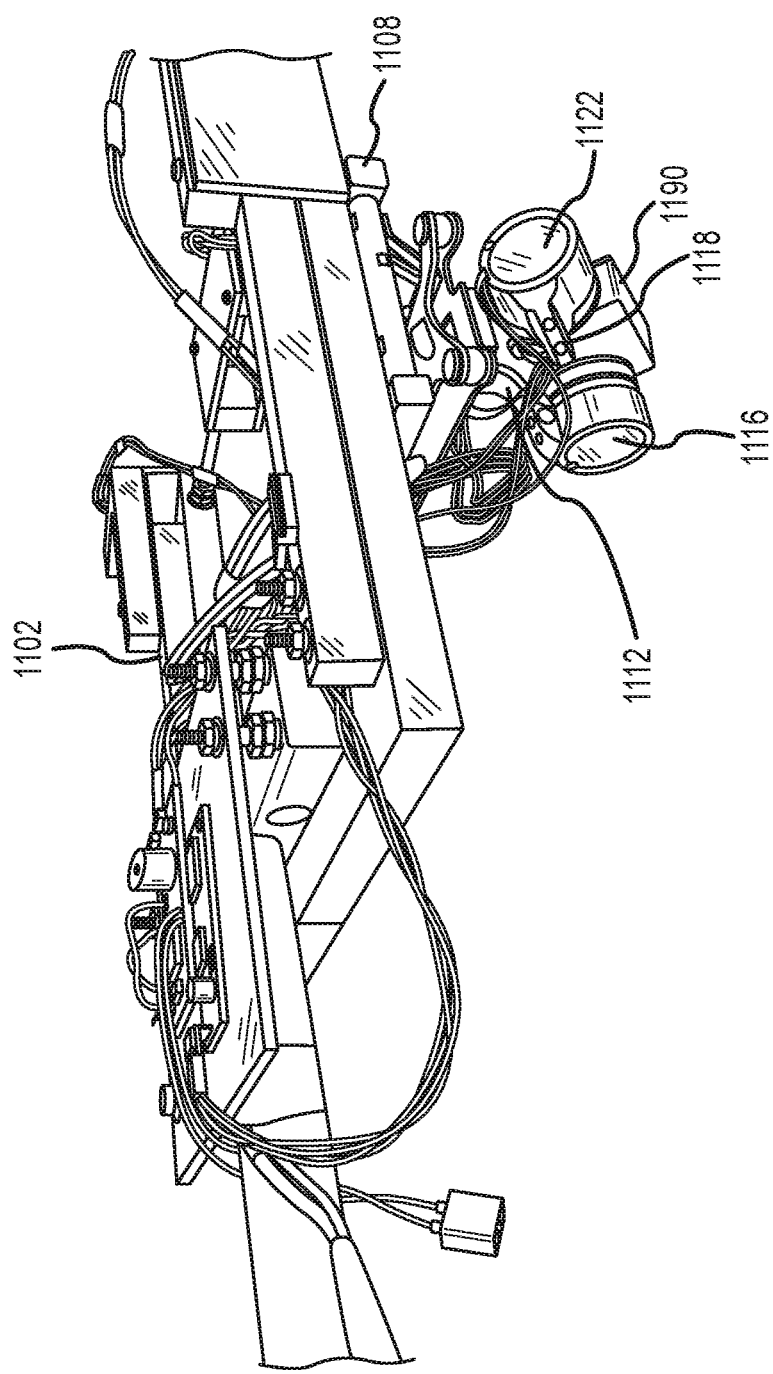

With reference to FIGS. 11-13, camera mount system 1100 is shown. Camera mount system 1100 includes pan servomotor 1164. Boom structure 1102 may be coupled to or integrally a part of boom 1134. Boom 1134 comprises boom distal controls 1150. Boom distal controls 1150 comprises mount 1152 and control inputs 1154. Boom 1134 may further comprise a counterweight disposed on a proximal end. Boom structure 1102 is coupled to light arrays 1160 and 1161. Boom structure 1102 is shown supporting shaft 1104. Shaft 1104 defines axis of rotation 1106. Rotating mount 1162 is coupled to shaft 1104 and is free to rotate about axis of rotation 1106. Rotating mount 1162 is coupled to pan servomotor 1164. Pan servomotor 1164 is coupled to support structure 1108. Support structure 1108 is coupled to assembly 1180. Assembly 1180 is coupled to upper arm 1112. Upper arm 1112 is coupled to first servomotor 1116. First servomotor 1116 is coupled to lateral arm 1118. Lateral arm 1118 is coupled to second servomotor 1122. Second servomotor is coupled to cradle 1124. Cradle 1124 may be coupled to accelerometer 1190. Processor 1166 is coupled to boom structure 1102 and is in electrical communication and/or wireless communication (such as RF communication) with at least one of pan servomotor 1164, first servomotor 1116, and second servomotor 1122. Power supply 1182 may be in electrical communication with processor 1166 and one or more of light arrays 1160 and 1161, pan servomotor 1164, first servomotor 1116, and second servomotor 1122. Wires 1168 may carry electrical signals between one or more of processor 1166, light arrays 1160 and 1161, pan servomotor 1164, first servomotor 1116, and second servomotor 1122, among other components. Wires 1168 may be run through boom structure 1102 and/or boom 1134, though as shown wires 1168 are disposed external to boom structure 1102 and boom 1134.

Similar to camera mount system 100, rotating mount 1162 is configured to rotate about shaft 1104. In that regard, rotating mount 1162 is configured to rotate by the force of gravity as the pitch of boom structure 1102 is changed.

Pan servomotor 1164 is configured to control yaw rotation. Pan servomotor may thus be user controlled via, for example, control inputs 1154. Control inputs 1154 may comprise one or more buttons, toggles, levers, and/or wheels, among other control inputs. Control inputs 1154 may be configured to receive commands for changing yaw position and forwarding those commands to, for example, processor 1166 or directly to pan servomotor 1164. Pan servomotor 1164 may be configured to rotate from about 1 degree to 360 degrees.

Pan servomotor 1164 may be controlled by processor 1166 to maintain a constant or near constant yaw position. Processor 1166 may be configured to receive information from accelerometer 1190 regarding motion about one or more of axis 806, axis 804 and axis 802. Processor 1166 may be configured to calculate counter-movements based upon the information from accelerometer 1190 that will cancel and/or reduce the effect of the acceleration observed by accelerometer 1190. For example, if accelerometer 1190 indicates that motion about axis 804 (FIG. 8) may occur, processor 1166 may command second servomotor 1122 to move in an equal and opposite direction. In that manner, cradle 1124 will stay motionless or nearly motionless with respect to axis 804 (FIG. 8). Processor 1166 may be configured to command at least one of pan servomotor 1164, first servomotor 1116 and second servomotor 1122.

For example, in various embodiments, processor 1166 may be and/or may implement proportional-integral-derivative ("PID") control logic. PID control logic may involve generating control signals in response to the present error of a system, an accumulation of past errors in a system, and a prediction of future errors based upon the rate of change of errors in a system. PID logic may be used to control one or more servomotors to "cancel" unintended motion about one or more axes.

In that regard, processor 1166 may be configured to command pan servomotor 1164 to "cancel" yaw movements within a given degree from a starting position. For example, processor 1166 may command pan servomotor 1164 to "cancel" yaw movements within 5 degrees of an initial position. However, in various embodiments, processor 1166 may allow pan servomotor to rotate (i.e., pan cradle 1124) in response to sensing, for example, yaw motion more than 5 degrees from an initial position. For example, processor 1166 may allow pan servomotor 1164 to "pan with" boom structure 1102 and cause pan servomotor to change yaw position in response to movement of boom structure 1102. In that regard, boom structure 1102 may initiate a pan motion (for example, turning around a corner in a hallway) and processor 1166 may allow pan servomotor to "pan with" boom structure 1102. Stated another way, processor 1166 may command pan servomotor 1164 to rotate in response to movement of boom structure 1102. In such a scenario, cradle 1124 may "follow" the movement of boom structure 1102. Such configuration allows cradle 1124 to pan, similar to way a person may rotate their head while walking around a corner.

Mount 1152 may comprise a mount to receive smartphone, tablet, or other device. Mount 1152 may comprise a ball joint. A ball joint typically comprises a ball fit into a receiving structure such as a cup. The ball may be rotated within the cup to a desired orientation. A ball joint may further comprise a retention ring that may be placed around the cup to fix the position of the ball within the cup. A smartphone may be supported by a ball of a ball joint and thus oriented to a desired position prior to being fixed, for example, by use of a retention ring or other tensioning device.

Light arrays 1160 and 1161 may comprise any suitable light source. For example, light arrays 1160 and 1161 may comprise incandescent lamps, light emitting diodes ("LEDs"), florescent lamps, and any other suitable source of light. In various embodiments, light arrays 1160 and 1161 emit the same intensity of light and color temperature of light. However, in various embodiments, light arrays 1160 and 1161 may emit different color temperatures of light. Such embodiments may be especially useful for use indoors, where cool light from outdoors may be mixed with warm light from indoor lighting. As referred to herein, warm light may refer to light of color temperature below 4000K and cool light may be referred to as light above 4000K. In various embodiments, light arrays 1160 and 1161 may be configured to emit high intensity light for the purposes illuminating a poorly lit subject. However, in various embodiments, light arrays 1160 and 1161 may emit relatively low intensity light. In that regard, light arrays 1160 and 1161 may emit light of intensity sufficient to reduce "shadowing" that may appear during video capture that results from a person, boom or boom structure blocking ambient light. Light arrays 1160 and 1161 may also be mounted on hinges or similar structures that enable rotation about, for example, shaft 1104. In that regard, as boom structure 1102 changes pitch, light arrays 1160 and 1161 may also change pitch.

Power supply 1182 may be any suitable power supply, for example, a DC source such as a battery. Power supply 1182 may supply electrical power to one or more light arrays 1160 and 1161, processor 1166, pan servomotor 1164, first servomotor 1116, and second servomotor 1122.

Figure 14:
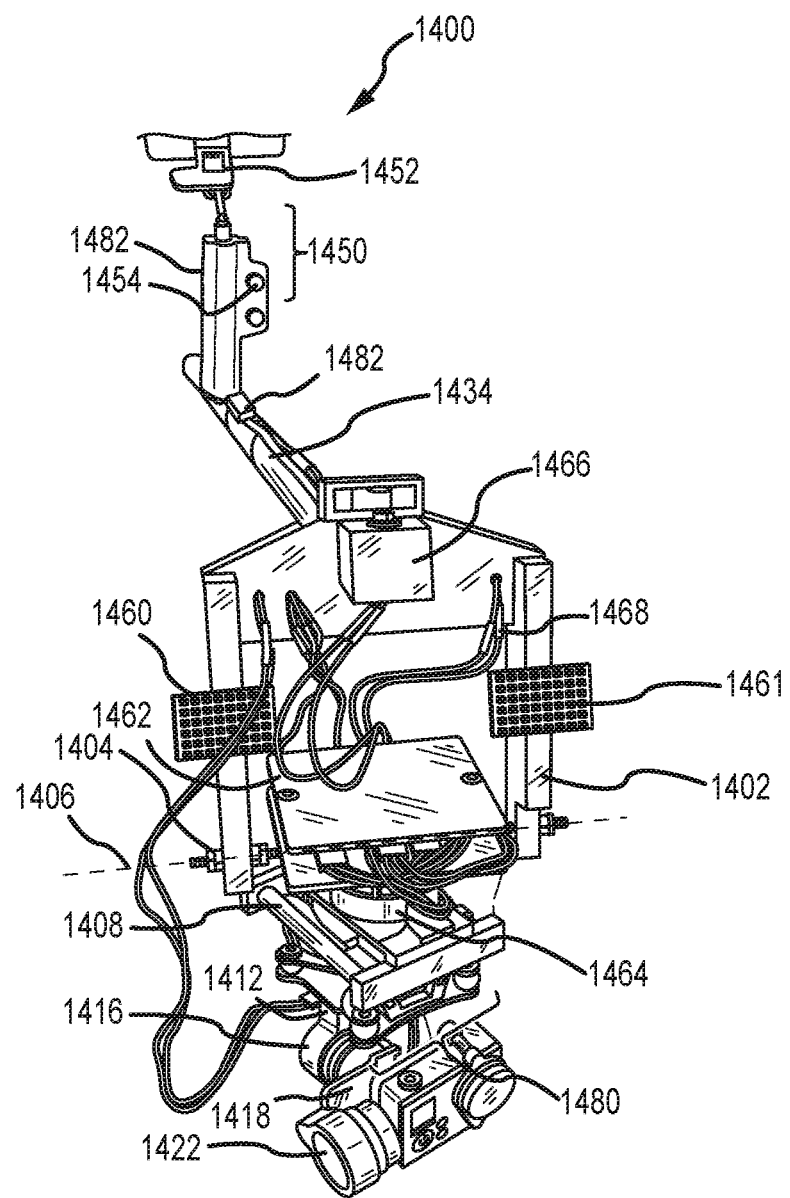
FIGS. 14-15 illustrate a camera mount system, in accordance with various embodiments, including various booms.
Figure 15:
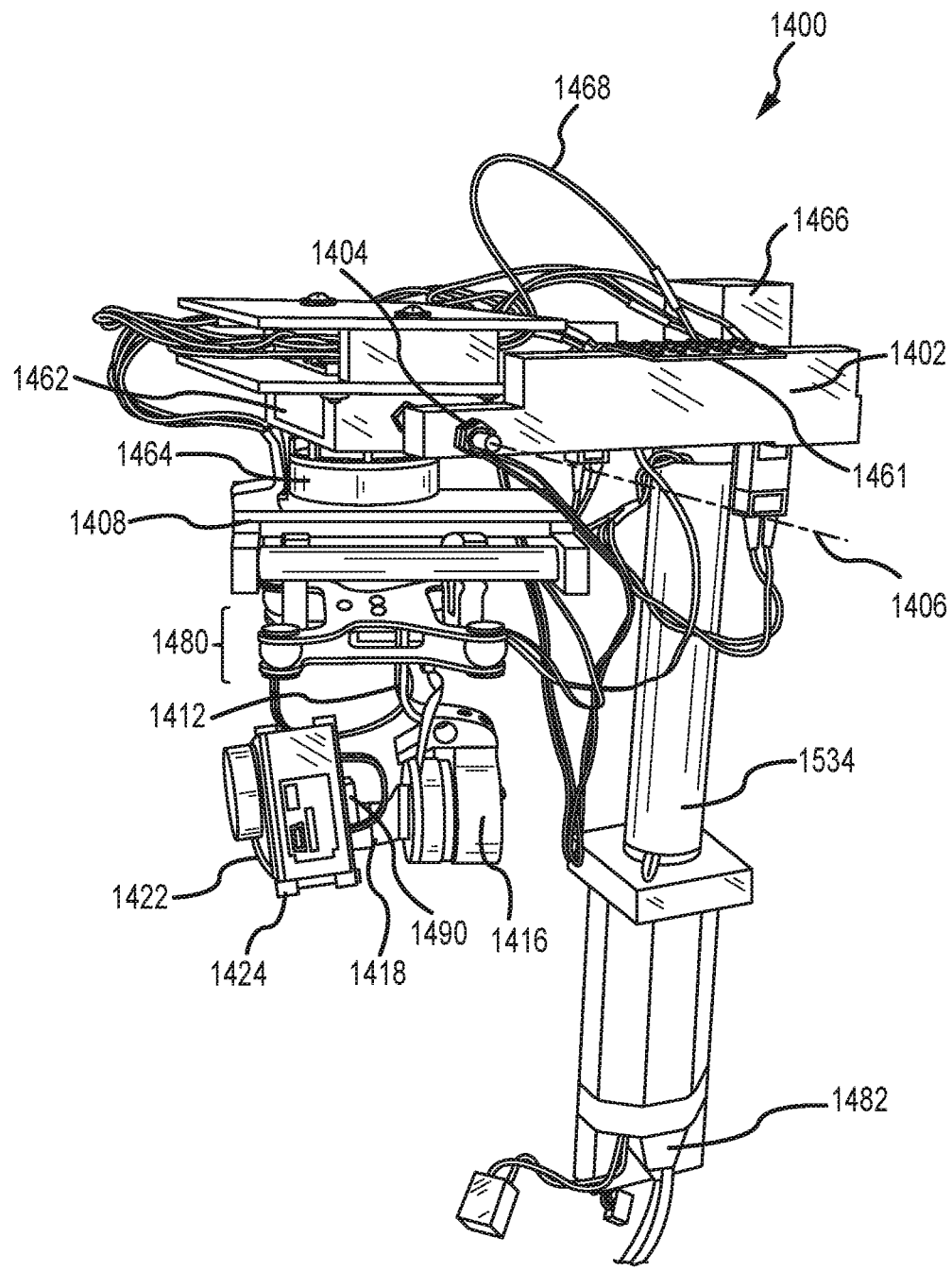

With reference to FIGS. 14-15, camera mount system 1400 is shown. Camera mount system 1400 includes pan servomotor 1464. Boom structure 1402 may be coupled to or integrally a part of boom 1434 (FIG. 14). Boom 1434 comprises boom distal controls 1450. Boom distal controls 1450 comprises mount 1452 and control inputs 1454. Boom 1434 may further comprise a counterweight disposed on a proximal end. Boom structure 1402 is coupled to light arrays 1460 and 1461. Boom structure 1402 is shown supporting shaft 1404.

Alternatively, in various embodiments boom structure 1402 may be coupled to or integrally a part of boom 1534 (FIG. 15). As shown, in various embodiments, boom structure 1402 may be interchangeably coupled with a part of boom 1434 (FIG. 14) and/or a part of boom 1534 (FIG. 15). For example, boom structure 1402 may be coupled with a part of boom 1434 to form an arrangement wherein the boom 1434 may extend in a direction substantially parallel to a plane of at least one surface of rotating mount 1462 when the plane of rotating mount 1462 is positioned parallel to the horizon. In contrast, boom structure 1402 alternatively may be coupled with a part of boom 1534 wherein the boom 1534 may extend in a direction normal to the plane of at least one surface of rotating mount 1462 when the plane of rotating mount 1462 is positioned parallel to the horizon. Moreover, boom 1434 and/or boom 1534 may extend in a direction substantially parallel to the direction of gravity or may extend in a direction substantially perpendicular to the direction of gravity. Furthermore, as illustrated in FIGS. 14 and 15, a boom may have various lengths. For example, a boom 1434 may be significantly longer than a boom 1534. In this regard, a boom 1534 may be said to be a compact hand-held boom, whereas a boom 1434 may be said to be a long counterbalanced boom. Thus, one will appreciate in light of the disclosure herein that boom structure 1402 may comprise a pair of interchangeable booms, boom 1434 and boom 1534, whereby a user may reconfigure a camera mount system 1400 as desired. Alternatively, as one will also appreciate in light of the disclosure herein, boom structure 1402 may comprise one or the other of boom 1434 and boom 1534, and not be interchangeable, for example, for a boom structure 1402 that is integrally a part of boom 1434 or is integrally a part of boom 1534. Still furthermore, a boom may incorporate and combine various features from various different embodiments, for example, a compact hand-held boom may incorporate a counterbalance according to the principles herein. As such, boom 1534 may further comprise a counterweight disposed on a proximal end.

Shaft 1404 defines axis of rotation 1406. Rotating mount 1462 is coupled to shaft 1404 and is free to rotate about axis of rotation 1406. Rotating mount 1462 is coupled to pan servomotor 1464. Pan servomotor 1464 is coupled to support structure 1408. Support structure 1408 is coupled to assembly 1480. Assembly 1480 is coupled to upper arm 1412. Upper arm 1412 is coupled to first servomotor 1416. First servomotor 1416 is coupled to lateral arm 1418. Lateral arm 1418 is coupled to second servomotor 1422. Second servomotor is coupled to cradle 1424. Cradle 1424 may be coupled to accelerometer 1490. Processor 1466 is coupled to boom structure 1402 and is in electrical communication and/or wireless communication (such as RF communication) with at least one of pan servomotor 1464, first servomotor 1416, and second servomotor 1422. Power supply 1482 may be in electrical communication with processor 1466 and one or more of light arrays 1460 and 1461, pan servomotor 1464, first servomotor 1416, and second servomotor 1422. Wires 1468 may carry electrical signals between one or more of processor 1466, light arrays 1460 and 1461, pan servomotor 1464, first servomotor 1416, and second servomotor 1422, among other components. Wires 1468 may be run through boom structure 1402 and/or boom 1434 and/or boom 1534, though as shown wires 1468 are disposed external to boom structure 1402 and boom 1434 (and/or boom 1534).

Similar to camera mount system 100, rotating mount 1462 is configured to rotate about shaft 1404. In that regard, rotating mount 1462 is configured to rotate by the force of gravity as the pitch of boom structure 1402 is changed.

Pan servomotor 1464 is configured to control yaw rotation. Pan servomotor may thus be user controlled via, for example, control inputs 1454. Control inputs 1454 may comprise one or more buttons, toggles, levers, and/or wheels, among other control inputs. Control inputs 1454 may be configured to receive commands for changing yaw position and forwarding those commands to, for example, processor 1466 or directly to pan servomotor 1464. Pan servomotor 1464 may be configured to rotate from about 1 degree to 360 degrees.

Pan servomotor 1464 may be controlled by processor 1466 to maintain a constant or near constant yaw position. Processor 1466 may be configured to receive information from accelerometer 1490 regarding motion about one or more of axis 806, axis 804 and axis 802. Processor 1466 may be configured to calculate counter-movements based upon the information from accelerometer 1490 that will cancel and/or reduce the effect of the acceleration observed by accelerometer 1490. For example, if accelerometer 1490 indicates that motion about axis 804 (FIG. 8) may occur, processor 1466 may command second servomotor 1422 to move in an equal and opposite direction. In that manner, cradle 1424 will stay motionless or nearly motionless with respect to axis 804 (FIG. 8). Processor 1466 may be configured to command at least one of pan servomotor 1464, first servomotor 1416 and second servomotor 1422.

For example, in various embodiments, processor 1466 may be and/or may implement proportional-integral-derivative ("PID") control logic. PID control logic may involve generating control signals in response to the present error of a system, an accumulation of past errors in a system, and a prediction of future errors based upon the rate of change of errors in a system. PID logic may be used to control one or more servomotors to "cancel" unintended motion about one or more axes.

In that regard, processor 1466 may be configured to command pan servomotor 1464 to "cancel" yaw movements within a given degree from a starting position. For example, processor 1466 may command pan servomotor 1464 to "cancel" yaw movements within 5 degrees of an initial position. However, in various embodiments, processor 1466 may allow pan servomotor to rotate (i.e., pan cradle 1424) in response to sensing, for example, yaw motion more than 5 degrees from an initial position. For example, processor 1466 may allow pan servomotor 1464 to "pan with" boom structure 1402 and cause pan servomotor to change yaw position in response to movement of boom structure 1402. In that regard, boom structure 1402 may initiate a pan motion (for example, turning around a corner in a hallway) and processor 1466 may allow pan servomotor to "pan with" boom structure 1402. Stated another way, processor 1466 may command pan servomotor 1464 to rotate in response to movement of boom structure 1402. In such a scenario, cradle 1424 may "follow" the movement of boom structure 1402. Such configuration allows cradle 1424 to pan, similar to way a person may rotate their head while walking around a corner.

Mount 1452 may comprise a mount to receive smartphone, tablet, or other device. Mount 1452 may comprise a ball joint. A ball joint typically comprises a ball fit into a receiving structure such as a cup. The ball may be rotated within the cup to a desired orientation. A ball joint may further comprise a retention ring that may be placed around the cup to fix the position of the ball within the cup. A smartphone may be supported by a ball of a ball joint and thus oriented to a desired position prior to being fixed, for example, by use of a retention ring or other tensioning device.

Light arrays 1460 and 1461 may comprise any suitable light source. For example, light arrays 1460 and 1461 may comprise incandescent lamps, light emitting diodes ("LEDs"), florescent lamps, and any other suitable source of light. In various embodiments, light arrays 1460 and 1461 emit the same intensity of light and color temperature of light. However, in various embodiments, light arrays 1460 and 1461 may emit different color temperatures of light. Such embodiments may be especially useful for use indoors, where cool light from outdoors may be mixed with warm light from indoor lighting. As referred to herein, warm light may refer to light of color temperature below 4000K and cool light may be referred to as light above 4000K. In various embodiments, light arrays 1460 and 1461 may be configured to emit high intensity light for the purposes illuminating a poorly lit subject. However, in various embodiments, light arrays 1460 and 1461 may emit relatively low intensity light. In that regard, light arrays 1460 and 1461 may emit light of intensity sufficient to reduce "shadowing" that may appear during video capture that results from a person, boom or boom structure blocking ambient light. Light arrays 1460 and 1461 may also be mounted on hinges or similar structures that enable rotation about, for example, shaft 1404. In that regard, as boom structure 1402 changes pitch, light arrays 1460 and 1461 may also change pitch.

Power supply 1482 may be any suitable power supply, for example, a DC source such as a battery. Power supply 1482 may supply electrical power to one or more light arrays 1460 and 1461, processor 1466, pan servomotor 1464, first servomotor 1416, and second servomotor 1422.

With reference to FIGS. 16a-19, camera mount system 1600 is shown. Camera mount system 1600 includes pan servomotor 1616. Boom structure 1602 may be coupled to or integrally a part of at least one of boom 1702 and hand-held boom 1650. Boom 1702 comprises boom distal controls 1850. Boom distal controls 1850 comprises mount 1812 and control inputs 1810. In various embodiments, boom distal controls 1850 may comprise a joystick detent. The joystick may output a variable voltage in response to displacement from a central "home" position, the output voltage being referred to as a displacement signal. This displacement signal may be received and/or processed by one or more of a processor of control element 1614, pan servomotor 1616, first servomotor 1620, and second servomotor 1618. This displacement signal may cause camera mount system 1600 to toggle between two or more control modes. In various embodiments, the control mode may comprise pitch control, configured to control the pitch of a camera 1628, yaw control, configured to control the yaw of a camera 1628, and/or roll control, configured to control the yaw of a camera 1628.

Boom 1702 may further comprise a counterweight disposed on a proximal end. Boom structure 1602 is shown supporting shaft 1604. As shown, in various embodiments, boom structure 1602 may be interchangeably coupled with a part of boom 1702. For example, one or more fasteners 1703 may be used to secure boom 1702 to boom structure 1602. In that regard, fasteners 1703 may be passed through an aperture of flange 1704 and into a corresponding portion of boom structure 1602. Mounting feature 1622 may enable accessories such as a video broadcast transmitter to be mounted to boom structure 1602. Mounting feature 1622 may comprise an aperture, boss, indentation, or other structure capable of supporting an accessory.

Boom structure 1602 (also referred to as a head assembly) is modular may be interchangeably coupled with various booms, mounts, and other support structures. In particular, one or more mounting features, such as the apertures in boom structure 1602 that support fasteners 1703, allow the boom structure 1602 to be removably coupled to a variety of other accessories. As described herein, boom structure 1602 may be removably coupled to long booms (e.g., booms 5 feet or more in length), handheld booms (e.g., booms of approximately 6 inches to less than 5 feet in length), and stationary mounts such as a vehicle mount. A vehicle mount may comprise a structure configured to mount on a vehicle such as an automobile, motorcycle, bicycle, hang glider, airplane, hot air balloon, or the like. A vehicle may restrain the boom structure 1602 from motion with respect to the vehicle, but allow for camera stabilization and control as described herein. In that regard, the boom structure 1602 may be used in conjunction with a variety of other accessories to enable photography that would otherwise produce shaky and/jittery output.

In various embodiments, boom 1702 comprises a suitable material such as a metal (e.g., aluminum, titanium, etc.) and/or a composite material. In various embodiments, boom 1702 comprises a fiber composite material such as a carbon fiber-reinforced polymer and/or other fibrous reinforced polymer. As used herein, a "carbon fiber-reinforced polymer" may comprise any carbon fiber material that is reinforced with a polymeric material, such a thermoset and/or thermoplastic. For example, a carbon fiber-reinforced polymer may comprise carbon fiber reinforced with epoxy. As used herein, boom 1702 may comprise a "fibrous reinforced polymer." In that regard, a fibrous reinforced polymer may include a fibrous material such as carbon fibers, aramid fibers, fiberglass fibers, or similar fibers reinforced with a polymeric material, such a thermoset and/or thermoplastic. Fibrous reinforced polymers tend to have a high strength to weight ratio, typically allowing for a stiff component to be produced with relatively light weight as compared to various metals.

Boom 1702 may comprise a collapsible joint 1720. With momentary reference to FIGS. 18*b* and 18*c*, collapsible joint 1720 may comprise a boom hinge 1722 and a boom screw aperture 1724. Boom hinge 1722 may couple a first portion 1732 of boom 1702 to a second portion 1734 of boom 1702 and may define a first hinge axis disposed perpendicular to boom 1702. Boom screw aperture 1724 may be configured to receive a screw 1726, pin, fastener, and/or the like. The screw 1726, pin, fastener, and/or the like may be configured to hingeably couple the first portion 1732 of boom 1702 to the second portion 1734 of boom 1702. In response to the first portion 1732 of boom 1702 being decoupled from the second portion 1734 of boom 1702, the first portion 1732 of boom 1702 may be configured to rotate about the first hinge axis such that the first portion 1732 of boom 1702 rotates radially towards the second portion 1734 of boom 1702. In various embodiments, the first portion 1732 of boom 1702 may be configured to rotate 180 degrees or less towards the second portion 1734 of boom 1702. Rotation of the first portion 1732 of boom 1702 towards the second portion 1734 of boom 1702 may allow camera mount system 1600 to collapse such that packaging, storage, transportation, and the like are improved.

Boom 1702 may be coupled to at least one of T joint 1802 and distal shaft 1814. T joint 1802 may comprise a metal (e.g., aluminum, titanium, etc.), a metal alloy, and/or a composite material such as fibrous reinforced polymer. T joint 1802 may comprise a T shaped joint having three coupling points, with two of the three coupling points disposed one hundred eighty (180) degrees from one another and the third coupling point disposed ninety (90) degrees from the other two coupling points. T joint 1802 may comprise a collapsible joint. With momentary reference to FIG. 18*b*, T joint 1802 may comprise a T hinge 1822 and a T screw aperture 1824. T hinge 1822 may couple a portion of control shaft 1804 to distal shaft 1814 and may define a second hinge axis disposed perpendicular to both control shaft 1804 and distal shaft 1814. T screw aperture 1824 may be configured to receive a screw, pin, fastener, and/or the like. The screw, pin, fastener, and/or the like may be configured to hingeably couple a portion of control shaft 1804 to boom 1702. In response to the portion of control shaft 1804 being decoupled from boom 1702, control shaft 1804 may be configured to rotate about the second hinge axis such that control shaft 1804 rotates radially towards distal shaft 1814. In various embodiments, control shaft 1804 may be configured to rotate 90 degrees towards distal shaft 1814. Rotation of control shaft 1804 towards distal shaft 1814 may allow camera mount system 1600 to collapse such that packaging, storage, transportation, and the like are improved.

T joint 1802 may be coupled to control shaft 1804. Control shaft 1804 may comprise a metal (e.g., aluminum, titanium, etc.) and/or a composite material such as fibrous reinforced polymer. Control shaft 1804 supports boom distal controls 1850. Control shaft 1804 also supports hand rest 1806. Hand rest 1806 is disposed at a slight angle (e.g., 4-10 degrees and, in various embodiments, 7 degrees) from control shaft 1804. In this manner, a force exerted on hand rest 1806 in the direction of boom 1702 may not result in hand rest 1806 moving with respect to control shaft 1804. Hand rest 1806 may secured to control shaft 1804 by tightening fasteners 1808. T joint 1802 may be coupled to distal shaft 1814.

Distal shaft 1814 may comprise a metal (e.g., aluminum, titanium, etc.) and/or a composite material such as fibrous reinforced polymer. Distal shaft 1814 supports power housing 1816.

Power housing 1816 comprises power supply 1902, power supply housing 1910, connection portion 1906 and end weight 1904. Power housing 1816 may comprise a metal (e.g., aluminum, titanium, etc.) and/or a composite material such as fibrous reinforced polymer. Power supply housing 1910 may comprise a metal (e.g., aluminum, titanium, etc.) and/or a composite material such as fibrous reinforced polymer. Power housing 1816 may define a volume in which power supply 1902 is at least partially disposed. Power supply 1902 may comprise any suitable power supply, for example, a DC source such as a battery. In various embodiments, power supply 1902 may supply DC current at between about 4V and about 16V and/or, for example, about 5V and/or about 12V, where the term "about" in this context only may refer to +/−0.5V. Power supply 1902 may supply electrical power to one or more of a processor of control element 1614, pan servomotor 1616, first servomotor 1620 and second servomotor 1618. Connection portion 1906 may secure power supply 1902 in place and couple to at least one of power supply housing 1910 and end weight 1904. End weight 1904 may be sized to shift the center of gravity of camera mount system 1600 to be at or near T joint 1802. In various embodiments, end weight 1904 may be sized to shift the center of gravity of camera mount system 1600 to be at any selected portion of camera mount system 1600.

Shaft 1604 defines axis of rotation 1608. Control element 1614 is coupled to shaft 1604 and is free to rotate about axis of rotation 1608. Shaft 1604 may comprise a bushing, conduit, and/or tube. The bushing may define a hollow pathway. The bushing may be coupled to and/or received by a clevis configured to allow rotation of control element 1614 about axis of rotation 1608. In that regard, the hollow pathway may house wires or other conductive materials while the bushing allows for rotation about axis of rotation 1608.

Control element 1614 is coupled to pan servomotor 1616. Control element 1614 is coupled to counterweight 1610 via shaft 1612. Counterweight 1610 may comprise any material suitable to provide a counterweight to rotation about axis of rotation 1608, for example, any metal and/or polymeric material. In various embodiments, counterweight 1610 is in threaded engagement with shaft 1612. Pan servomotor 1616 is coupled to upper arm 1632. Upper arm 1632 is coupled to first servomotor 1620. First servomotor 1620 is coupled to lateral arm 1634. Lateral arm 1634 is coupled to second servomotor 1618. Second servomotor is coupled to cradle 1630. Cradle 1630 may be coupled to accelerometer 1636.

Figure 16A:
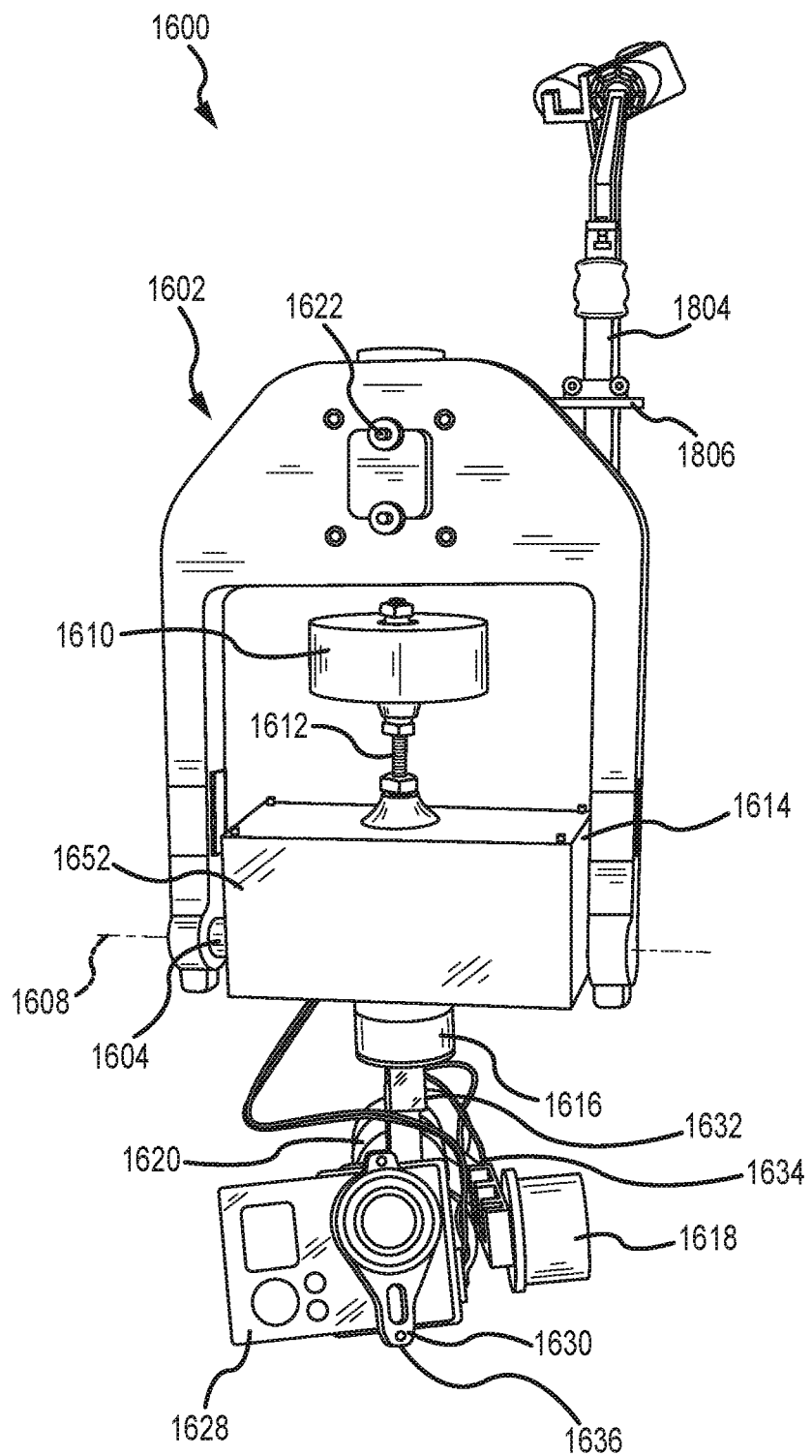
FIGS. 16*a*-19 illustrate a camera mount system, in accordance with various embodiments.
Figure 16B:
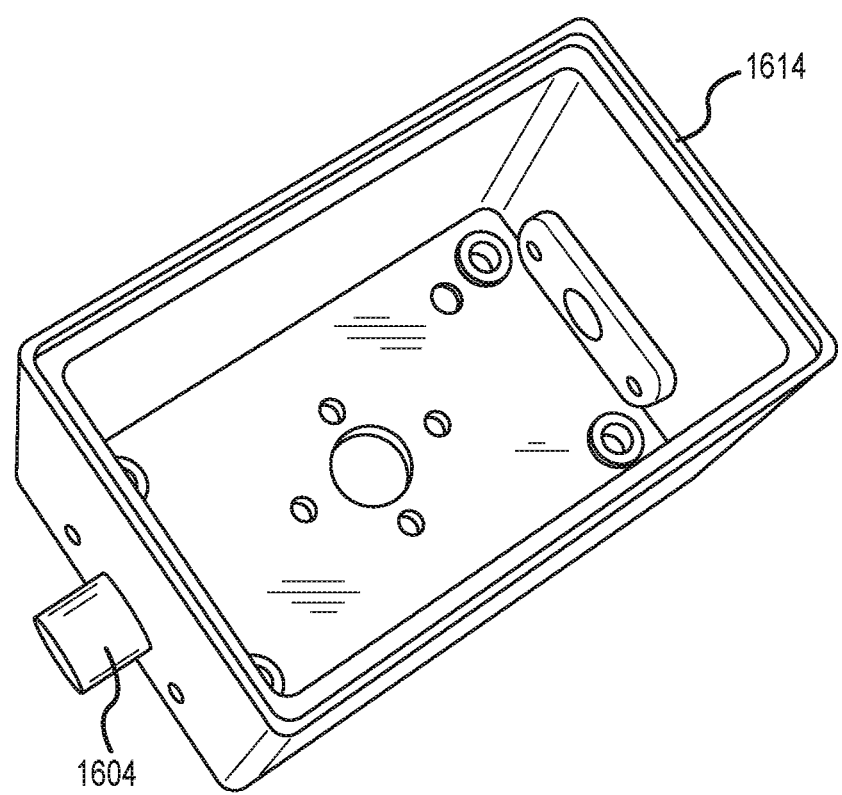

With momentary reference to FIG. 16b, control element 1614 may define a hollow interior. Wires, processors, power supplies and/or other components may be disposed within control element 1614. The hollow interior of control element 1614 may be in fluid communication with at least one of shaft 1604 and other portions of camera mount system 1600.

Control element 1614 may comprise one or more processors and is in electrical communication and/or wireless communication (such as RF communication) with at least one of pan servomotor 1616, first servomotor 1620, and second servomotor 1618. Power supply 1902 may be in electrical communication with control element 1614, pan servomotor 1616, first servomotor 1620, and second servomotor 1618. Wires within boom 1702 and boom structure 1602 may carry electrical signals between one or more of control element 1614, pan servomotor 1616, first servomotor 1620, and second servomotor 1618, among other components. Wires within boom 1702 may meet at a connector and join to boom structure 1602 via a corresponding connector. For example, boom 1702 may comprise a male DIN connector that is attached to wires within boom 1702. Boom structure 1602 may comprise a female DIN connector that is attached to wires within boom structure 1602. Boom 1702 may then be coupled to boom structure 1602, the male and female connector mating so as to place wire in boom 1702 in electrical communication with wires in boom structure 1602. Wires in boom structure 1602 may travel through shaft 1604 and enter control element 1614. In that regard, wires in boom structure 1602 may place power supply 1902 in electrical communication with control element 1614, pan servomotor 1616, first servomotor 1620, and second servomotor 1618. In various embodiments, shaft 1604 carries electricity from power supply 1902 to control element 1614, pan servomotor 1616, first servomotor 1620, and second servomotor 1618. In various embodiments, shaft 1604 carries low voltage electrical signals (e.g., electrical signals that encode data) from control element 1614 to other components, such as control inputs 1810, with brief reference to FIG. 18.

Similar to camera mount system 100, control element 1614 is configured to rotate about shaft 1604. In that regard, control element 1614 is configured to rotate by the force of gravity as the pitch of boom 1702 is changed.

Pan servomotor 1616 is configured to control yaw rotation. Pan servomotor may thus be user controlled via, for example, control inputs 1810. Control inputs 1810 may comprise one or more buttons, toggles, levers, and/or wheels, among other control inputs. Control inputs 1810 may comprise a Hall Effect disc shaped controller that may output a voltage responsive to movement of the disc shaped controller. Control inputs 1810 may be configured to receive commands for changing yaw position and forwarding those commands to, for example, control element 1614 or directly to pan servomotor 1616. Pan servomotor 1616 may be configured to rotate from about 1 degree to 360 degrees.

Pan servomotor 1616 may be controlled by control element 1614 to maintain a constant or near constant yaw position. Control element 1614 may be configured to receive information from accelerometer 1636 regarding motion about one or more of axis 806, axis 804 and axis 802 (with brief reference to FIG. 8). Control element 1614 may be configured to calculate counter-movements based upon the information from accelerometer 1636 that will cancel and/or reduce the effect of the acceleration observed by accelerometer 1636. For example, if accelerometer 1636 indicates that motion about axis 804 (with brief reference to FIG. 8) may occur, control element 1614 may command second servomotor 1618 to move in an equal and opposite direction. In that manner, cradle 1630 will stay motionless or nearly motionless with respect to axis 804 (with brief reference to FIG. 8). Control element 1614 may be configured to command at least one of pan servomotor 1616, first servomotor 1620 and second servomotor 1618.

For example, in various embodiments, control element 1614 may comprise a processor that implements proportional-integral-derivative ("PID") control logic. PID control logic may involve generating control signals in response to the present error of a system, an accumulation of past errors in a system, and a prediction of future errors based upon the rate of change of errors in a system. PID logic may be used to control one or more servomotors to "cancel" unintended motion about one or more axes.

In that regard, control element 1614 may be configured to command pan servomotor 1616 to "cancel" yaw movements within a given degree from a starting position. For example, a processor of control element 1614 may command pan servomotor 1616 to "cancel" yaw movements within 5 degrees of an initial position. However, in various embodiments, a processor of control element 1614 may allow pan servomotor to rotate (i.e., pan cradle 1630) in response to sensing, for example, yaw motion more than 5 degrees from an initial position. For example, a processor of control element 1614 may allow pan servomotor 1616 to "pan with" boom structure 1602 and cause pan servomotor 1616 to change yaw position in response to movement of boom structure 1602. In that regard, boom structure 1602 may initiate a pan motion (for example, turning around a corner in a hallway) and a processor of control element 1614 may allow pan servomotor 1616 to "pan with" boom structure 1602. Stated another way, a processor of control element 1614 may command pan servomotor 1616 to rotate in response to movement of boom structure 1602. In such a scenario, cradle 1630 may "follow" the movement of boom structure 1602. Such configuration allows cradle 1630 to pan, similar to way a person may rotate their head while walking around a corner.

Figure 16C:
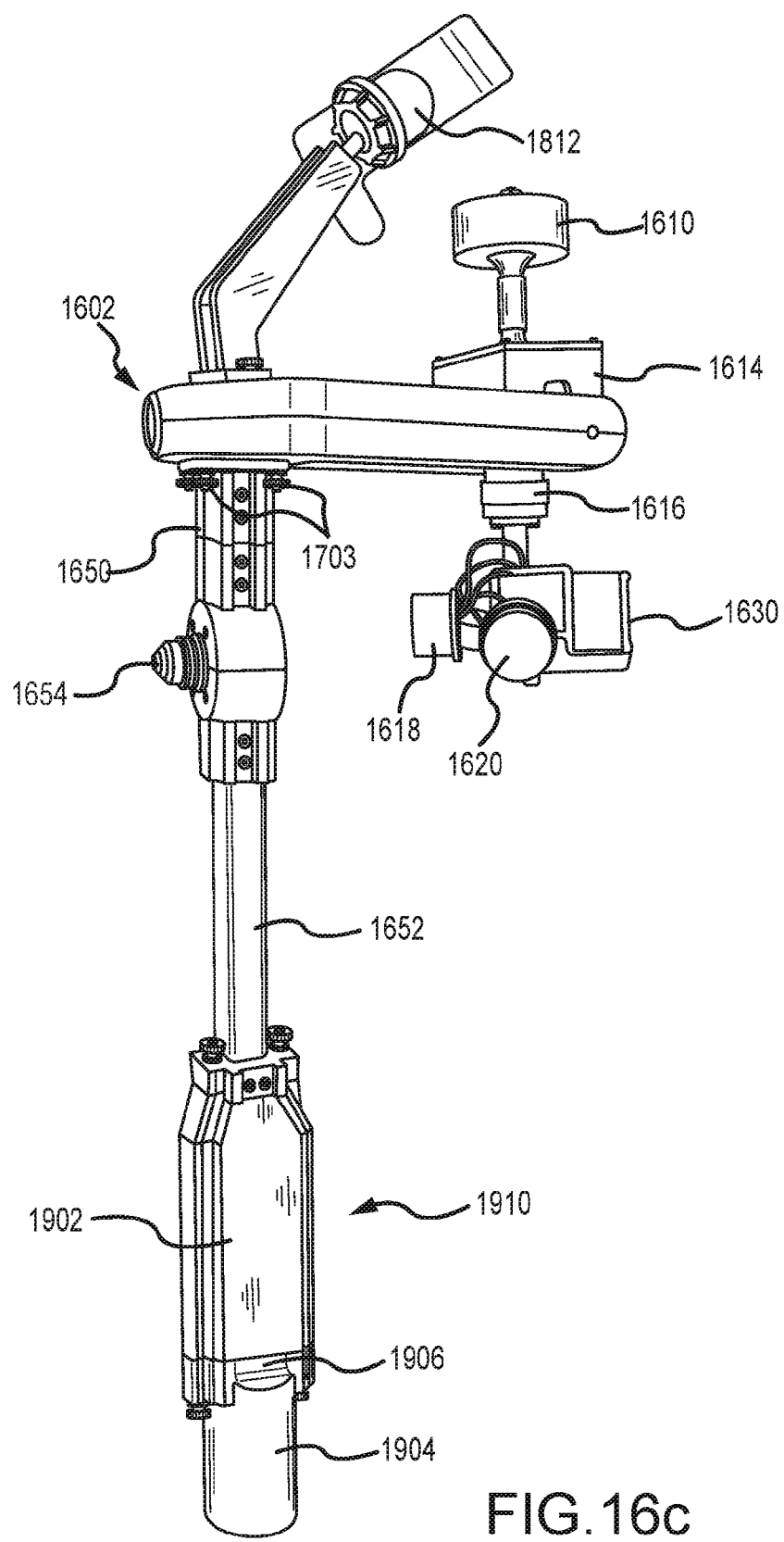
Figure 17:
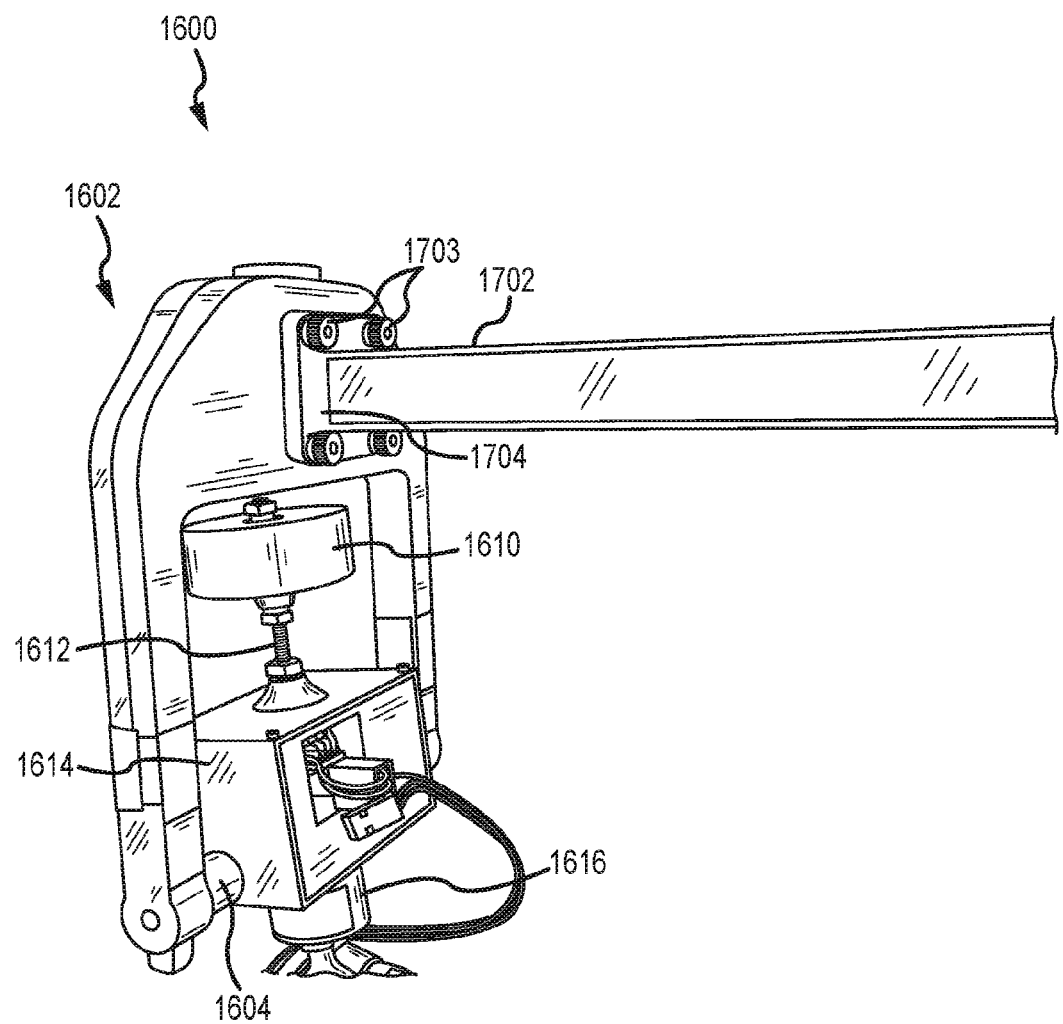
Figure 18A:
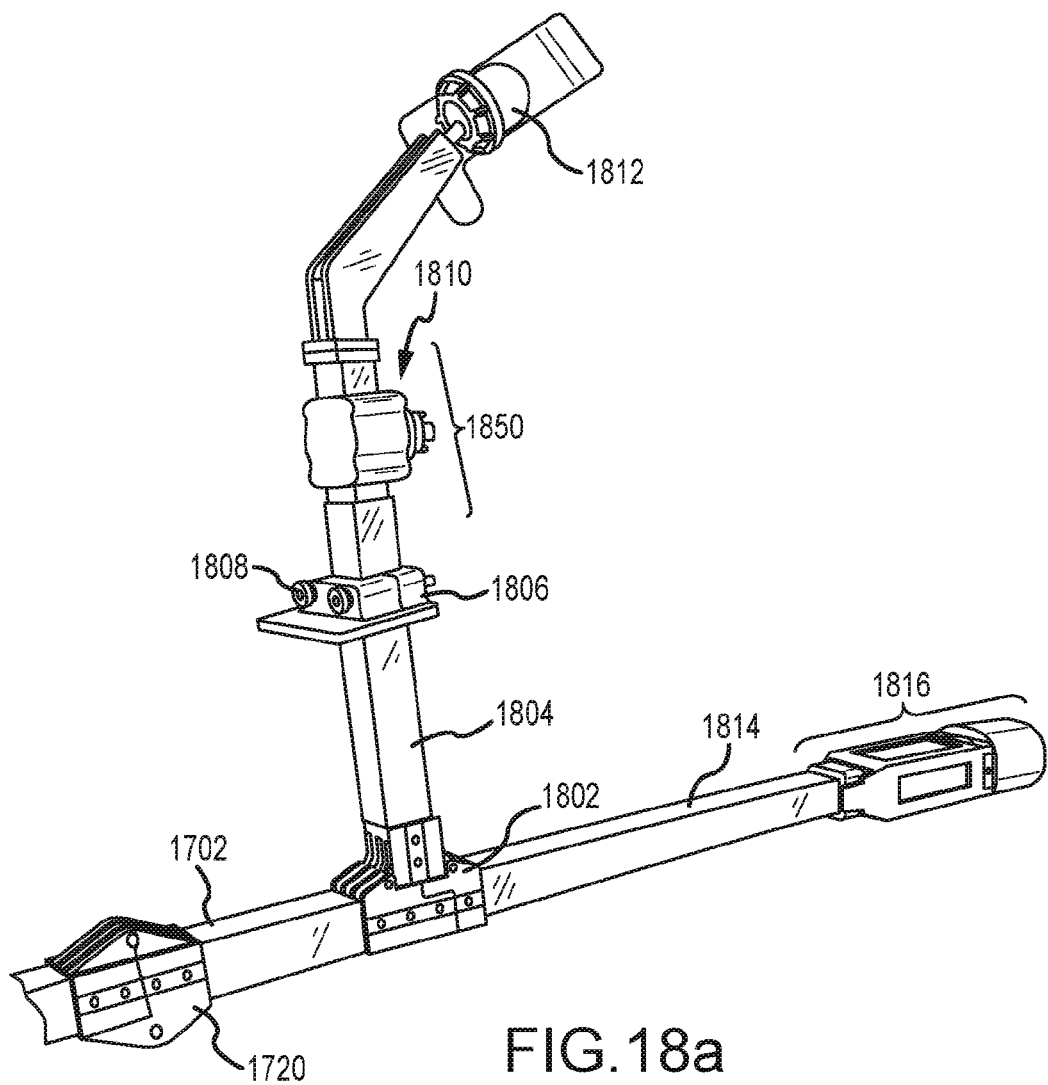
Figure 18B:
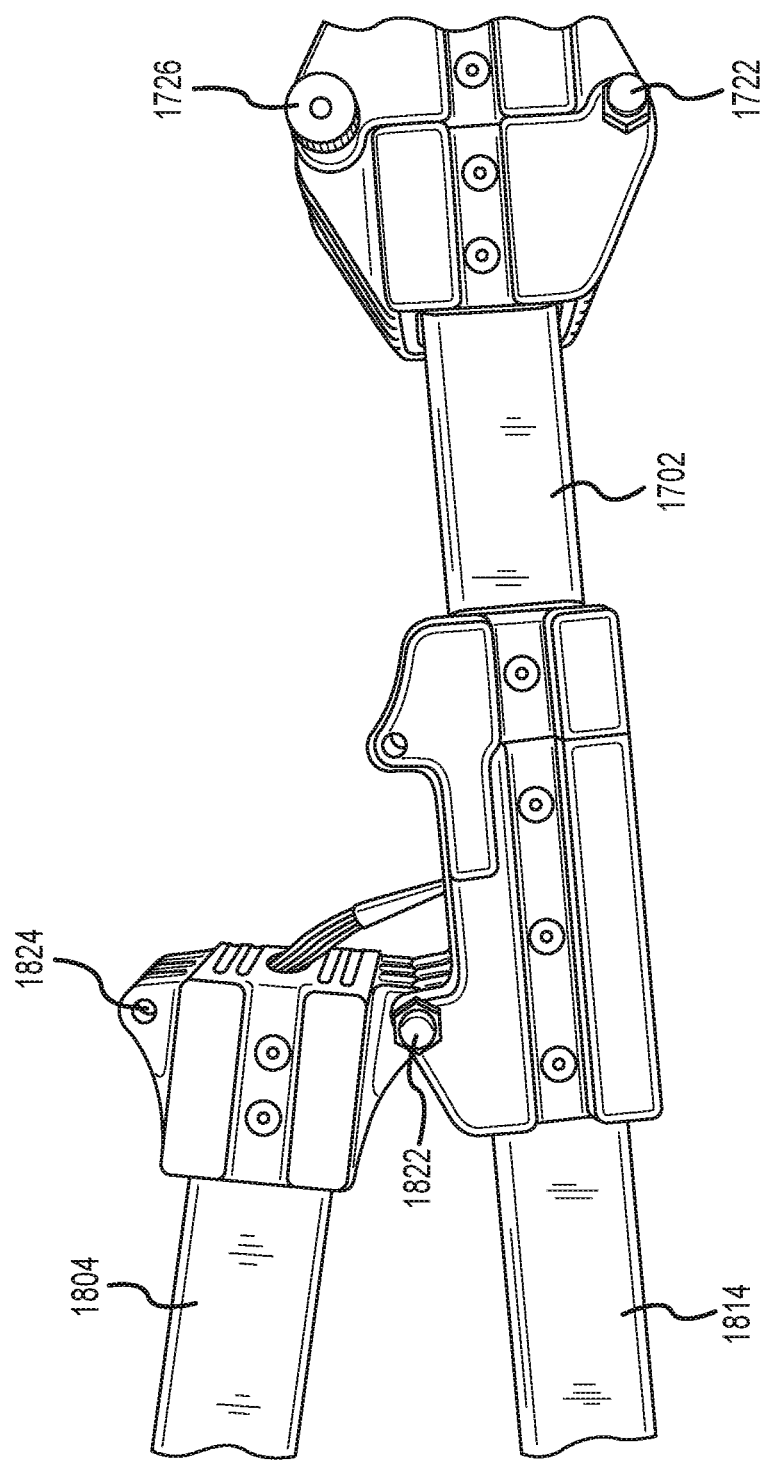
Figure 18C:
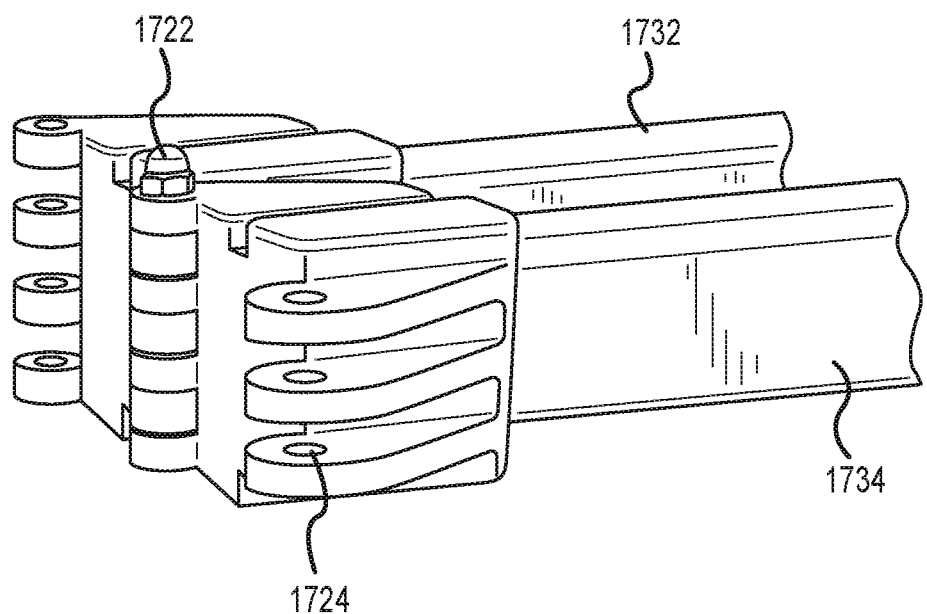
Figure 19:
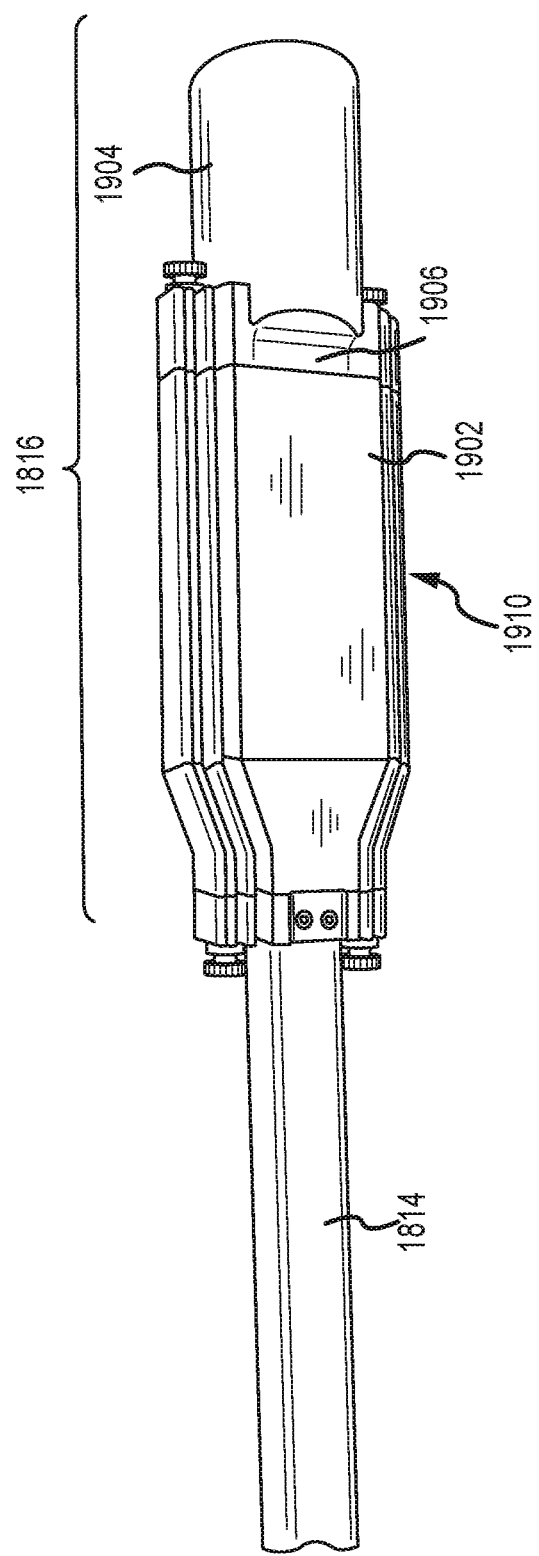

With brief reference to FIG. 16c, the clevis-shaped boom structure 1602 may be removably coupled to at least one of a hand-held boom 1650 and a handheld distal shaft 1652. Wires may be run through boom structure 1602, hand-held boom 1650, and/or distal shaft 1652, and may be in electrical connection with one or more of hand-held boom distal joystick 1654, a processor of control element 1614, pan servomotor 1616, first servomotor 1620, and second servomotor 1618, among other components of camera mount system 1600. Hand-held boom distal joystick 1654 may be configured to output a displacement signal as already described herein. Camera mount system 1600 may be configured to be modular such that the handheld boom [1650 and/or a mount 1812 may be removably coupled to boom structure 1602, and removed and replaced with a long boom (such as boom 1702) and/or a stationary mount such as a vehicle mount as described herein. Hand-held boom 1650 may be coupled to power supply housing 1910, as described herein.

Mount 1812 may comprise a mount to receive smartphone, tablet, or other device. Mount 1812 may comprise a ball joint. A ball joint typically comprises a ball fit into a receiving structure such as a cup. The ball may be rotated within the cup to a desired orientation. A ball joint may further comprise a retention ring that may be placed around the cup to fix the position of the ball within the cup. A smartphone may be supported by a ball of a ball joint and thus oriented to a desired position prior to being fixed, for example, by use of a retention ring or other tensioning device.

Figure 20:
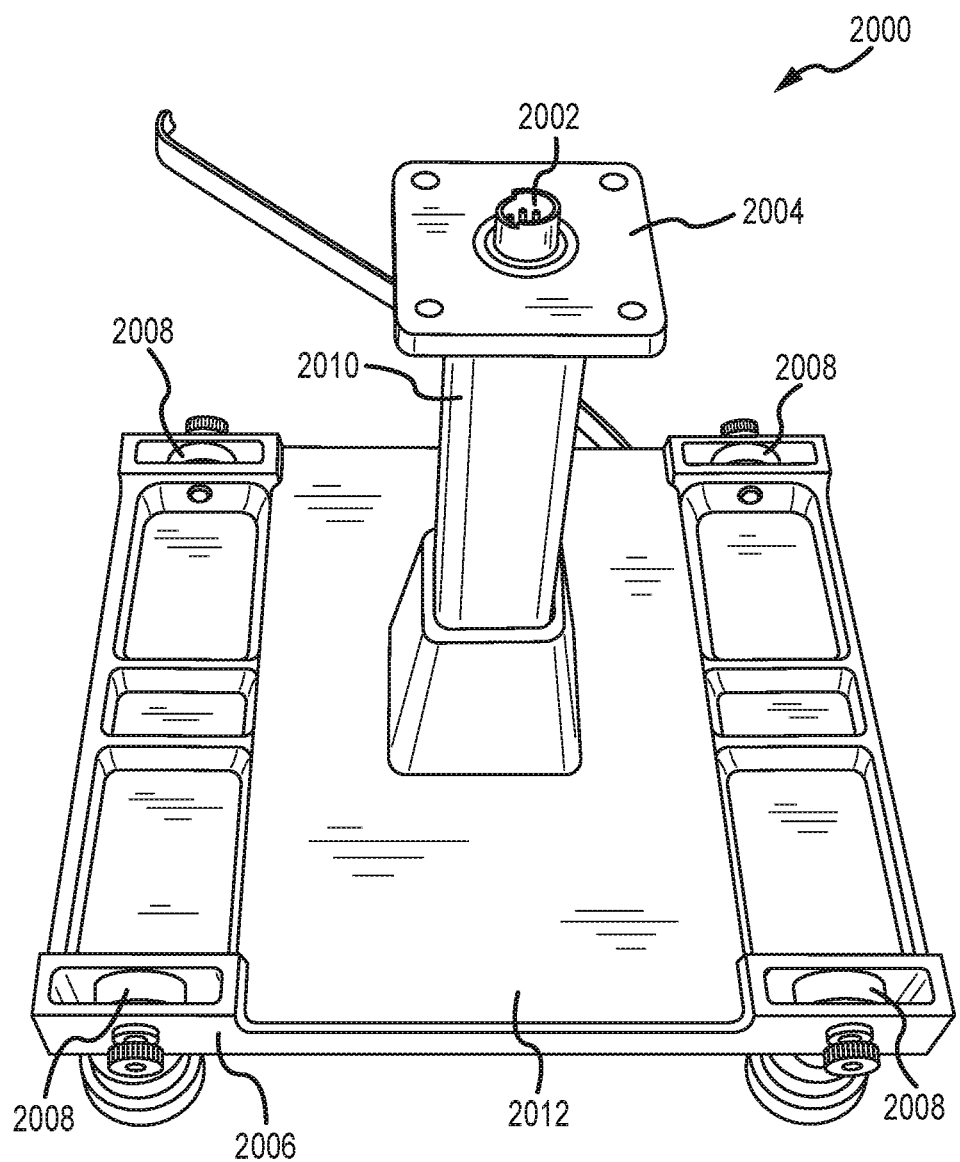
FIG. 20 illustrates a modular vehicle mount, in accordance with various embodiments.

With reference to FIG. 20, modular vehicle mount 2000 is illustrated. Modular vehicle mount 2000 is configured to mount to a surface of a vehicle or other surface. With momentary reference to FIG. 16a, modular vehicle mount 2000 may couple to boom structure 1602. In that regard, modular vehicle mount 2000 may be affixed to a vehicle and boom structure 1602, retaining boom structure 1602 to a vehicle and allowing for the benefits of the various features of boom structure 1602 to be enjoyed as a vehicle mounted system. Conventionally, vehicular mounted mount systems transmit motion from the vehicle to a camera, causing still images and video footage recorded from such system to suffer in quality. However, using modular vehicle mount 2000 with boom structure 1602, or any other boom structure as described herein, the stabilization and control benefits, among other benefits, of boom structure 1602 enable the production of still images and video that are substantially free of the effects of vehicular motion. As with other features described and contemplated herein, the modular nature of modular vehicle mount 2000 and boom structure 1602 allow for quick and easy coupling of components, as well as expanding the functionality of boom structure 1602 to different platforms to enable new modes of image capture.

Modular vehicle mount 2000 comprises frame 2006 that may accept base 2012. Frame 2006 may be coupled to feet 2008. Each of feet 2008 may comprise a ball mounted magnetic plate. In this regard, the magnetic plate of feet 2008 may be used to magnetically mount feet 2008 to a vehicle surface, such as a hood or roof of a car or truck, a metallic portion of a motorcycle, a boat, skateboard, snowboard, and/or bicycle, among other vehicles. In various embodiments, feet 2008 may also comprise various coupling devices for mounting modular vehicle mount 2000 to a vehicle, such as posts, threaded posts, clamps, adhesive surfaces, and the like.

Base 2012 is coupled to frame 2006. Base 2012 may be configured to support a boom structure such as boom structure 1602. Base 2012 comprises pedestal 2010 that extends perpendicular or substantially perpendicular to a surface of base 2012. In various embodiments, the length of pedestal 2010 may be adjusted to suit a particular application. For example, for use in confined spaces, pedestal 2010 may be relatively short (e.g., 0.5 inch to 1 inch) though in various embodiments pedestal 2010 may be from 1 inch to 12 inches in length. Pedestal 2010 may be removably coupled to base 2012, though in various embodiments pedestal 2010 and base 2012 may comprise one, integral component. Pedestal 2010 may comprise mounting flange 2004. Mounting flange 2004 may include one or more apertures or other mounting features to physical secure a boom structure such as boom structure 1602 to pedestal 2010. Coupling port 2002 is disposed on pedestal 2010, for example, on mounting flange 2004. Coupling port may comprise one or more connectors to place a booms structure, such as boom structure 1602, into electrical communication with modular vehicle mount 2000. Coupling port 2002 may carry low voltage electrical signals (e.g., electrical signals that encode data) and/or electrical power of higher voltages that may be suitable for driving one or more servomotors, such as pan servomotor 1616. Coupling port 2002 may comprise a DIN connector, for example, a male DIN connector to couple to a female DIN connector on boom structure 1602. Coupling port 2002 may be connected to wires running on or within modular vehicle mount 2000 for the conveyance of electricity to various other components, for example, control module 2100.

Figure 21:
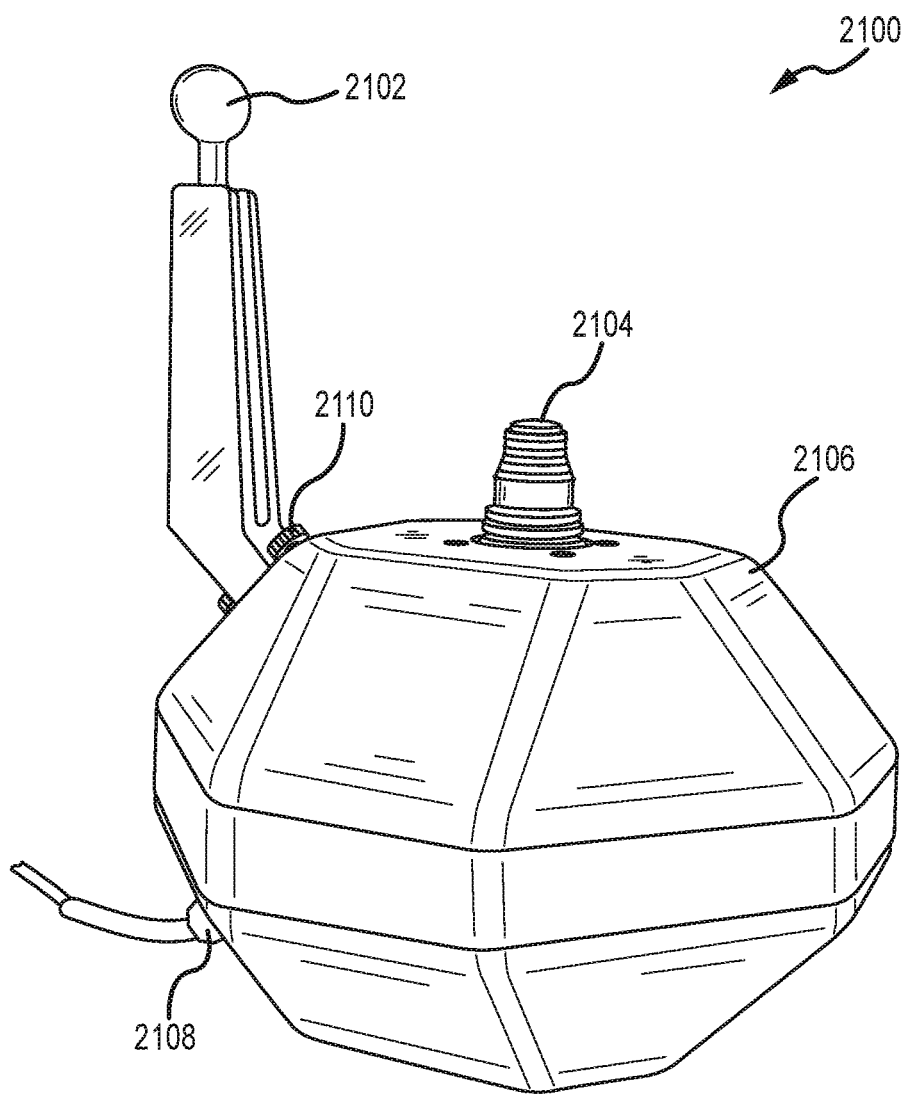
FIG. 21 illustrates a control module, in accordance with various embodiments.

With reference to FIG. 21, control module 2100 is illustrated. Control module 2100 may house one or more controls to control a boom structure and/or camera. Control module 2100 comprises housing 2106. Housing 2106 may take any suitable shape or form and may be comprised of any suitable material, for example, one or more of various metals, plastics, composite materials, and/or combinations thereof Housing 2106 may house a power source (e.g., a battery) to provide power to a boom structure such as boom structure 1602.

Control module 2100 is shown having coupling port 2108. Coupling port 2108 may carry low voltage electrical signals (e.g., electrical signals that encode data) and/or electrical power of higher voltages that may be suitable for driving one or more servomotors, such as pan servomotor 1616. Coupling port 2108 may comprise a DIN connector, for example, a female DIN connector. Control module 2100 also comprises extension 2102. Extension 2102 may comprise an antenna for the transmission of one or more control signals to a boom structure. Extension 2102 may also provide a physical mounting point to mount control module 2100 to another structure. Extension 2102 may be affixed to housing 2106 via fasteners 2110.

Control module 2100 comprises joystick 2104. Joystick 2104 may be configured to output a variable voltage in response to displacement from a central "home" position, the output voltage being referred to as a displacement signal.

This displacement signal may be forwarded to a boom structure, either via a wired connection or wireless through RF signals.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
   a shaft having an axis and mounted to a boom structure;
   a support structure configured to be coupled to the shaft, wherein the support structure is configured to rotate about the axis,
   wherein the support structure comprises a rotating mount having a control system mounted thereon,
   wherein the control system comprises an upper arm extending away from a plate.

2. The apparatus of claim 1, wherein the upper arm is coupled to a first servomotor proximate to a terminus of the upper arm.

3. The apparatus of claim 2, further comprising a lateral arm coupled to the first servomotor.

4. The apparatus of claim 3, further comprising a second servomotor coupled to a terminus of the lateral arm.

5. The apparatus of claim 4, further comprising a cradle coupled to the second servomotor.

6. The apparatus of claim 5, further comprising an accelerometer coupled to the cradle.

7. The apparatus of claim 6, wherein the plate is coupled to a processor, wherein the processor is in electrical communication with the first servomotor and the second servomotor.

8. The apparatus of claim 6, wherein the first servomotor is operative to control roll movement of the cradle.

9. The apparatus of claim 8, wherein the second servomotor is operative to control pitch movement of the cradle.

10. The apparatus of claim 8, further comprising a third servomotor coupled to the rotating frame and configured to control yaw movement of the cradle.

11. The apparatus of claim 9, wherein the plate is coupled to a processor, wherein the accelerometer is configured to convey acceleration information to the processor, and wherein the processor is configured to command the first servomotor in response to the acceleration information.

12. A method comprising:
    translating a cradle along a vertical axis; and
    rotating, in response to the translating, a support structure about a shaft,
    wherein the cradle is supported by the support structure,
    wherein the cradle remains stationary with regard to pitch rotation during the translating.

13. An apparatus comprising:
    a first shaft having an axis and mounted to a boom structure;
    a counterweight coupled to a second shaft, the second shaft coupled to a support structure;
    the support structure configured to be coupled to the first shaft, wherein the support structure is configured to rotate about the axis,
    wherein the support structure rotates about the axis in response to a change in pitch of the boom structure,
    wherein the boom structure is a clevis and the first shaft is a clevis pin.

14. The apparatus of claim 13, wherein the support structure rotates about the axis by operation of gravity.

15. The apparatus of claim 13, wherein the boom structure comprises at least one of a carbon fiber composite, aluminum, and stainless steel.

16. The apparatus of claim 13, wherein the boom structure is a bracket.

* * * * *